US010926589B2

(12) United States Patent
Vitolo et al.

(10) Patent No.: US 10,926,589 B2
(45) Date of Patent: Feb. 23, 2021

(54) ON-BOARD CENTRALIZED SYSTEM FOR REGULATING THE PRESSURE OF THE TYRES OF A MOTOR-VEHICLE

(71) Applicant: C.R.F. Società Consortile per Azioni, Orbassano (IT)

(72) Inventors: Roberto Vitolo, Turin (IT); Stefano D'Ambrosio, Turin (IT); Nicolo Salamone, Turin (IT); Giuseppe Martorana, Turin (IT); Michele Ieluzzi, Orbassano (IT); Giovanni Luigi Gabiati, Orbassano (IT); Dario Scantamburlo, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 301 days.

(21) Appl. No.: 15/778,374

(22) PCT Filed: Nov. 3, 2016

(86) PCT No.: PCT/IB2016/056609
§ 371 (c)(1),
(2) Date: May 23, 2018

(87) PCT Pub. No.: WO2017/089916
PCT Pub. Date: Jun. 1, 2017

(65) Prior Publication Data
US 2018/0345741 A1 Dec. 6, 2018

(30) Foreign Application Priority Data
Nov. 24, 2015 (IT) .......................... 102015000076131

(51) Int. Cl.
*B60C 23/00* (2006.01)

(52) U.S. Cl.
CPC .. *B60C 23/00327* (2020.05); *B60C 23/00318* (2020.05); *B60C 23/00354* (2020.05);
(Continued)

(58) Field of Classification Search
CPC ............ B60C 23/003; B60C 23/00318; B60C 23/00363; B60C 23/00372; B60C 23/00354; B60C 23/00327
See application file for complete search history.

(56) References Cited

U.S. PATENT DOCUMENTS 4,782,878 A * 11/1988 Mittal ................... B60C 23/003
137/225
5,221,381 A 6/1993 George
(Continued)

FOREIGN PATENT DOCUMENTS

| CN | 203472435 U | 3/2014 |
| EP | 2664466 A2 | 11/2013 |

(Continued)

OTHER PUBLICATIONS

Chinese Office Action dated Nov. 14, 2019. 6 pages.
PCT International Search Report and Written Opinion dated Jan. 19, 2017 for PCT International Application No. PCT/IB2016/056609, 13 pages.

*Primary Examiner* — Kip T Kotter
(74) *Attorney, Agent, or Firm* — RMCK Law Group, PLC

(57) ABSTRACT

An on-board centralized system for regulating pressure of tyres of a vehicle includes a pressurized air source, a circuit communicating the source with a plenum of each wheel, and an arrangement for connecting the plenum of each wheel to the inner chamber of the respective tyre that includes first and second connection lines for deflation and inflation, respectively, of the tyre, and first and second one-way valves interposed, respectively, in the first and second connection lines to allow only a flow of air respectively from and to the (Continued)

inner chamber. The first valve includes a spring having a pre-set load so as to isolate the inner chamber from a part of the circuit upstream of the first valve when said upstream part is at atmospheric pressure, and to guarantee a pre-set minimum value of pressure in the inner chamber when the upstream part is at a pressure lower than atmospheric pressure.

8 Claims, 24 Drawing Sheets

(52) U.S. Cl.
CPC ...... *B60C 23/00363* (2020.05); *B60C 23/003* (2013.01); *B60C 23/00372* (2020.05)

(56) References Cited

U.S. PATENT DOCUMENTS

| | | | |
|---|---|---|---|
| 6,283,186 | B1 | 9/2001 | Krisher |
| 6,868,719 | B1* | 3/2005 | Claussen ................. B60C 23/04 73/146.2 |
| 2012/0059546 | A1* | 3/2012 | Wilson ................... B60C 23/003 701/34.4 |
| 2014/0182704 | A1* | 7/2014 | Gonzaga ............... B60C 23/003 137/224 |

FOREIGN PATENT DOCUMENTS

| | | |
|---|---|---|
| EP | 2746068 A2 | 6/2014 |
| WO | 2012015669 A1 | 2/2012 |
| WO | 2012/071579 A1 | 5/2012 |

\* cited by examiner

ON-BOARD CENTRALIZED SYSTEM FOR REGULATING THE PRESSURE OF THE TYRES OF A MOTOR-VEHICLE

CROSS-REFERENCE TO RELATED APPLICATIONS

This application is a 371 U.S. National Stage of International Application No. PCT/IB2016/056609, filed Nov. 3, 2016, which claims priority to Italian Application No. 102015000076131, filed on Nov. 24, 2015. The disclosure of each of the above applications is incorporated herein by reference in their entirety.

FIELD OF THE INVENTION

The present invention relates in general to motor-vehicles and in particular to an on-board centralized system for regulating the pressure of the tyres of a motor-vehicle of the type referred to in the preamble of the annexed claim 1.

The invention may be used to particular advantage in passenger cars and light commercial vehicles.

Centralized automatic systems for regulating the inflation pressure of the tyres of a motor-vehicle (the so-called Central Tyre-Inflation Systems—CTISs) have been known for some time. They are able to manage autonomously the pressure of tyres of a motor-vehicle through means for inflating and deflating tyres. The system is usually made up of valves and connections that enable a communication of air between the inner chamber of the tyre and a central part of the system that contains a source of positive pressure and possibly a source of negative pressure, which enable increase or reduction of the pressure in the inner chamber of the tyre. A pneumatic rotary joint connects each wheel of the motor-vehicle to the central part of the circuit. The system is autonomously managed usually by means of an electronic microcontroller that evaluates the pressure of each tyre starting from the information acquired by one or more sensors, determines a target value of the inflation pressure, and manages accordingly control signals at input to electrically controlled actuators.

CTI systems are widely known in a large variety of versions. If it is true that they were first of all developed as means for optimising traction on different types of terrain, they are commonly intended also as a way to improve fuel consumption, with a positive impact on the dynamic behaviour of the vehicle, as well as on vehicle safety.

CTI systems can be used so as to maintain the nominal pressure of the tyres in normal driving conditions in order to avoid the disadvantages induced by deflated tyres, and moreover enable management of the pressure in particular driving conditions, for example in the case of driving on soft terrain.

Further benefits in terms of maneuverability and fuel consumption may be obtained if the pressure in normal driving conditions is not necessarily the nominal one (understood as the one indicated by the manufacturer of the vehicle), but is evaluated according to the state of the vehicle and the boundary conditions, as discussed in the document No. US 2012/0221196.

CTI systems, used as means for maintaining nominal or optimal pressure in normal driving conditions, are preferable to the systems that envisage direct pressure sensors or virtual (or indirect) pressure sensors on the wheels (Tyre-Pressure Monitoring Systems—TPMSs) for at least two reasons: in the first place, because TPM systems provide an indication of pressure and leave the user free to intervene or not in order to restore an optimal pressure, whereas CTI systems do not require intervention of the driver, and the operations of adaptation of the pressure to the target level can be carried out at a frequency that guarantees the desired level of pressure within a small tolerance range; in the second place, because CTI systems in terms of accuracy of measurement are much more reliable than indirect TPM systems, and at the same time enable all the disadvantages regarding costs, complexity of installation, difficulty of communication of direct TPM systems to be avoided. Indirect TPM systems, in fact, provide an estimate based upon the difference between the speed of rotation of the different wheels and are generally far from precise and even fallacious in the case where all the tyres are deflated in the same way. Direct TPM systems, on the other hand, require installation of pressure sensors directly within the inner chamber of the tyres in wireless communication with the control unit, with all the complications that this entails.

In CTI systems, since the inner chamber of the tyres is connected to the central part of the system, the measurements of the inflation pressure of the tyres can be obtained through wired sensors installed in the stationary part of the system, as illustrated for example in the documents Nos. U.S. Pat. Nos. 4,763,709, 4,640,331, and 7,367,371.

Several schemes of operation have been proposed over time for CTIS applications, with the general scheme initially presented by Turek in the U.S. Pat. No. 2,634,783, and then substantially confirmed over the years. This operating scheme has been improved with the introduction of electronic controls and solenoid valves, in addition to particular arrangements that have proven over time to solve some characteristic problems, such as: isolation of the inner chamber of the tyre from the central part of the system when no actuation is in progress in order to reduce the consequences of a possible failure of duct, tubular members, fittings, etc., and to reduce the friction and wear of the pneumatic rotary joints; the need to integrate the system with existing wheel configurations, avoiding the costs and complications linked to the development of special architectures, and the need to avoid the presence of critical parts on the outer surface of the wheel, potentially exposed to damage at the expense of safety; provision of a system layout that will render the system safe and at the same time easy to install; identification of strategies of measurement, control, and actuation that will enable good performance, strength, reliability, and flexibility of the system.

In addition to the ones already mentioned above, also the documents Nos. U.S. Pat. Nos. 4,678,017, 4,754,792, and US 2013/0276902 represent attempts at a solution to the above problems.

Modern CTI systems may be of the "semi-automatic" type, where the target pressure is selected by the driver (U.S. Pat. Nos. 4,763,709, 5,180,456), or else the systems may be able to evaluate the target pressure autonomously, for example according to the degree of slipping of the tyres and to the speed of the motor-vehicle (U.S. Pat. No. 5,327,346) or else according to various parameters, including environmental conditions, speed of the vehicle, information deriving from GPS, loading conditions of the vehicle, and data coming from other sub-systems, such as dynamic electronic stability-control systems, ABS, brake pedal, and steering-wheel input (US 2012/0221196).

Many solutions are configured in particular (albeit not exclusively) for motor-vehicles with pneumatic braking systems (U.S. Pat. Nos. 5,180,456, 4,754,792, 4,619,303). In any case, a source of pressure is obviously necessary: some documents specify that this may be a compressor driven mechanically or electrically (U.S. Pat. Nos. 5,587,698, 5,180,456). Another possibility is to use a turbosupercharger for supercharging the thermal engine, adapted for supplying the additional flow rate that is required by the CTI system (U.S. Pat. No. 6,779,618, US 2007/0144171).

The majority of the solutions proposed in the aforementioned documents envisages the presence of safety valves on the wheels, which normally disconnect the inner chamber of the tyres from the rest of the circuit. These valves are opened for inflation and deflation. In the case of inflation, opening of the valves is obtained by generating a sufficient overpressure upstream of the inner chamber of the tyre, whereas, in the case of deflation, the valves can be opened by means of a positive pressure (US 2013/0276902, U.S. Pat. No. 7,367, 371) or a negative pressure (U.S. Pat. No. 5,180,456) upstream of the inner chamber of the tyre.

Various solutions have been proposed regarding integration of components of a CTI system within a wheel assembly. Three main aspects can be identified in this context, which are: the type and position of the components that enable a fluid connection to be obtained between the rotating parts and the stationary part of the circuit; the configuration and position of the valves mounted on the wheel that enable disconnection of the inner chamber of the tyres from the rest of the system; the integration within the wheel assembly of the ducts that connect the aforesaid components. Solutions that tackle such aspects are illustrated in the documents Nos. U.S. Pat. Nos. 4,640,331, 4,678,017, 5,587,698, 5,221,381, 7,488,046, US 736737157, US 2013/0276902, U.S. Pat. Nos. 6,474,383, 7,168,468, 6,283,186. Many of these solutions have been developed with reference to wheel assemblies typical of industrial vehicles. In particular, whereas the solutions of U.S. Pat. Nos. 5,221,381 and 7,488,046 may be appropriate also for passenger vehicles, the architectures for driving wheels illustrated, for example, in the documents U.S. Pat. Nos. 7,367,371 and 6,283,186 exclusively refer to non-passenger vehicles. Other relevant prior arts are disclosed in documents EP 2 746 068 A2, EP 2 664 466 A2 and WO 2012 015 669 A1.

OBJECT OF THE INVENTION

The object of the present invention is to provide an on-board centralized system for regulating the pressure of the tyres of a motor-vehicle that will be sturdy, safe, and reliable, and that in particular will guarantee maintenance of a minimum safety level of the pressure in the inner chambers of the tyres of the motor-vehicle, also in the case of breakdown of the air-supply circuit, moreover enabling isolation of the tyre from the remaining parts of the air-supply circuit when the system is in the resting condition.

The object of the invention is moreover a method for estimating the inflation pressure of the tyres via the use of one or more wired sensors set in the stationary central stretch of the system.

A further object of the invention is to provide a system of the type referred to above, installation of which does not entail substantial modifications in the modes of installation and removal of the wheels of the motor-vehicle and at the same time entails minimal modifications to the configuration of the components present on the motor-vehicle.

SUMMARY OF THE INVENTION

With a view to achieving the aforesaid purposes, the object of the present invention is an on-board centralized system for regulating the pressure of the tyres of a motor-vehicle having the characteristics that are specified in the annexed claim 1. The invention is applicable both to a vehicle with just driving wheels and to a vehicle with driving wheels and non-driving wheels.

Thanks to the above characteristics, the system is able to guarantee always, in any operating condition, and also in the case of breakdown of the air-supply circuit, a minimum level of the pressure in the tyres of the motor-vehicle for safety reasons. By means of the configuration described there is moreover obtained the advantage of maintaining the environment downstream of the inflation and deflation valves— set in the proximity of the access to the space comprised between the tyres and the rim—normally disconnected from the parts of the air-supply circuit set upstream of the aforesaid valves, enabling depressurization of the pneumatic rotary joint during the resting steps of the system and enabling an isolation of the tyre in the case of failure of parts of the system set upstream of the inflation and deflation valves.

The present invention also regards a method for evaluation of the inflation pressure of the tyres via the use of one or more wired sensors set in the stationary part of the system, according to the annexed claim 2.

In a preferred embodiment, the two aforesaid connection lines associated to each wheel are constituted by passages formed in the body of the wheel, and the two aforesaid one-way valves are received in seats, which are also formed in the body of the wheel.

In a variant, the plenum of each wheel is defined within an accessory member mounted at the front on the free end of the wheel spindle. In this case, the above accessory member carries the aforesaid one-way valves and incorporates passages defining portions of the connection lines between the plenum and the one-way valves, the one-way valves being connected to the inner chamber of the tyre via respective tubes.

Once again in the aforesaid preferred embodiment, the plenum of the wheel is a cavity formed in the front surface of the wheel and closed by a cover removably fastened to the wheel. The aforesaid plenum is in communication with the air-supply circuit by means of a tubular connection element (having a first end connected to the respective wheel spindle and a second end received through a hole formed in a front wall of the wheel that constitutes the bottom of the aforesaid cavity defining the plenum). The tubular element is received through the hole with interposition of a tubular supporting sealing member. This configuration enables the operations of installation and removal of the wheel to remain unaltered as compared to conventional solutions.

Further characteristics and variants of the invention form the subject of the annexed dependent claims.

Thanks to the aforesaid characteristics, the system according to the invention is able to ensure, with extremely simple, safe, and reliable means, accurate control of the pressure of the tyres and/or a variation upwards or downwards of the pressure, according to the various operating characteristics of the vehicle itself, for example according to the load of the motor-vehicle and/or the type of terrain.

DETAILED DESCRIPTION OF PREFERRED EMBODIMENTS OF THE INVENTION

Further characteristics and advantages of the invention will emerge from the ensuing description, with reference to the annexed drawings, which are provided purely by way of non-limiting example and in which.

GENERAL CONFIGURATION OF THE AIR-SUPPLY CIRCUIT

Figure 23:
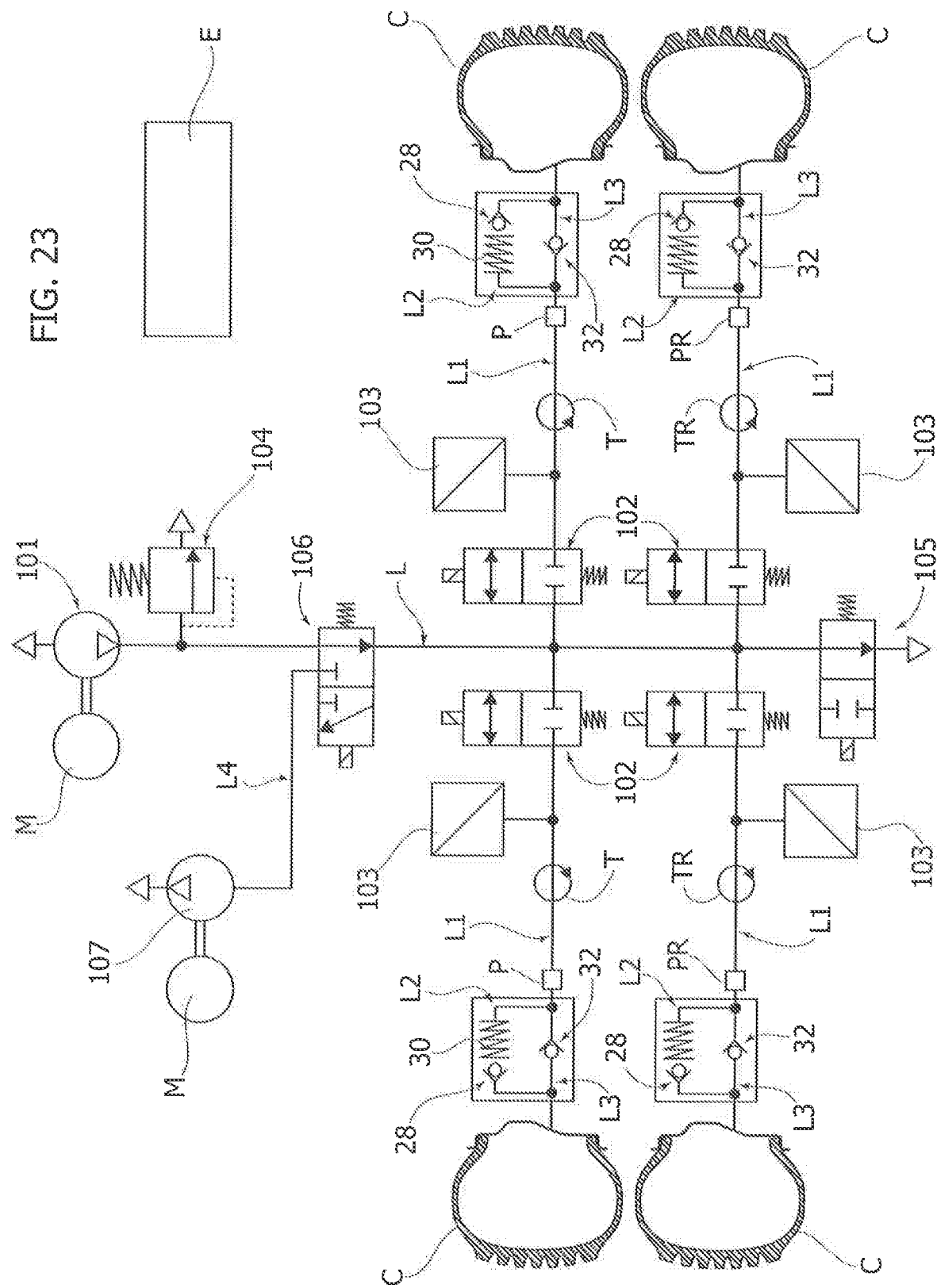
FIGS. 23 and 24 are, respectively, a first operating scheme and a second operating scheme of the system according to the invention.
Figure 24:
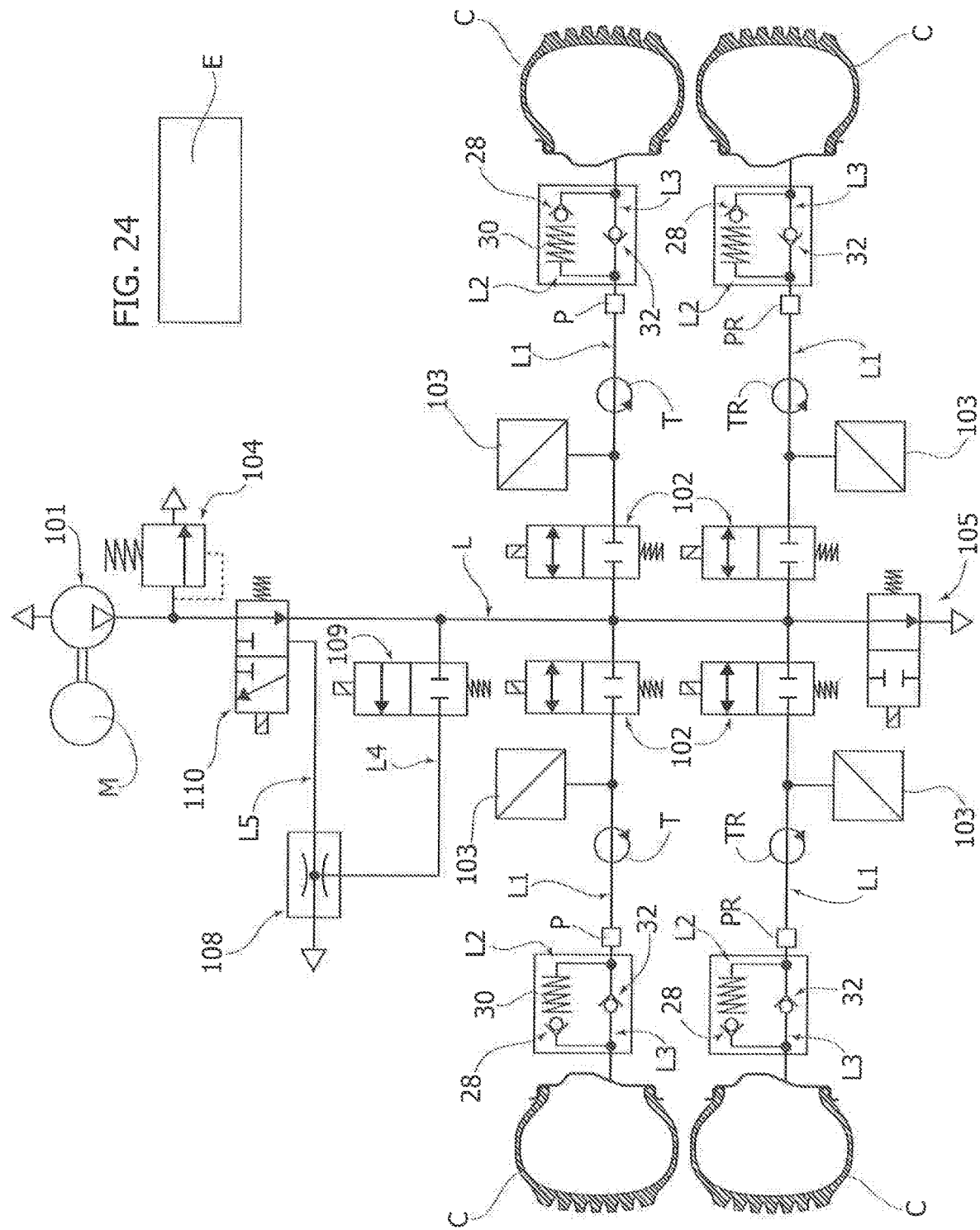

The general characteristics of the air-supply circuit used in the system according to the invention are here described with initial reference to the schemes of FIGS. 23 and 24 regarding two variant embodiments. The case represented hereinafter is an example of application of the system to a vehicle with two driving wheels and two non-driving wheels.

In both variants, the system comprises a source of pressurized air 101, typically constituted by a compressor driven by an electric motor M. Both the compressor 101 and the electric motor M are rigidly supported by the structure of the motor-vehicle.

The two driving wheels and the two driven wheels of the motor-vehicle have tyres, the inner chambers C of which are connected, in the ways that will be illustrated in detail in what follows, with a main line L that is designed to receive pressurized air from the compressor 101.

The main line L is connected to four peripheral lines L1. Two lines L1 communicate with two plenums P provided within the two driving wheels, and two lines L1 communicate with two plenums PR provided within the two driven wheels. Also the conformation and arrangement of the plenums P and PR will be described in greater detail in what follows.

Once again with reference to both FIG. 23 and FIG. 24, the plenums P associated to the driving wheels communicate with the main line L via toroidal pneumatic rotary joints T interposed along the respective lines L1. The plenums PR associated to the non-driving wheels communicate with the main line L via pneumatic rotary joints TR interposed along the respective lines L1. Also the pneumatic rotary joints T and TR will be described in detail in what follows.

Each pneumatic rotary joint T or TR constitutes the interface between the part of the respective line L1 that is stationary and supported by the structure of the motor-vehicle and the part of the respective line L1 that is fixed with respect to the wheel and turns therewith.

Once again with reference to both FIG. 23 and FIG. 24, and as will be described in greater detail in what follows, each plenum P or PR communicates with the inner chamber C of the respective tyre via two lines L2, L3, set in parallel with respect to one another for deflating and inflating, respectively, the tyre. Interposed in the lines L2 and L3 are two one-way valves 28, 32, respectively, which enable a flow of air only from and to the inner chamber of the tyre. Associated to each valve 28, which is prearranged to enable deflation of the tyre, is a return spring 30 having a pre-set load in such a way as to isolate the inner chamber C of the tyre of each wheel from the part of the circuit upstream of the one-way valve 28 when this upstream part of the circuit is at atmospheric pressure and the pressure within the inner chamber C is lower than a pressure value corresponding to the aforesaid pre-set load, and in such a way as to guarantee a pre-set minimum value of the pressure of the inner chamber C of the tyre when the part of the circuit upstream of the one-way valve 28 is at a pressure lower than atmospheric pressure.

Interposed in the part of each line L1 that connects the respective pneumatic rotary joint T, TR to the main line L are a solenoid valve 102 designed to open or close communication, and a pressure sensor 103, which is to be used, in the ways that will be described in what follows, for monitoring the pressure in the inner chamber of the respective tyre.

Once again with reference to both FIG. 23 and FIG. 24, provided in the main line L, immediately downstream of the compressor 101, is a pressure-limiting valve 104, which for reasons of safety sets the line L in communication with the external environment when the pressure in the line exceeds a maximum admissible value. Once again provided in the main line L is a solenoid valve 105, which is also designed to vent the line L towards the external atmosphere.

The function of the solenoid valve 105 is to depressurize all the part of the system upstream of the valves 28 and 32 at the end of each actuation and maintain the central part of the system at ambient pressure when the system itself is not in operation. This enables minimization of the friction on the gaskets of the pneumatic rotary joints T, TR, thus improving the mechanical efficiency of the system and increasing the service life of the component.

In the resting condition, in which the entire system upstream of the valves 28 and 32 is kept at ambient pressure, maintenance of the pressure in the tyres is guaranteed by the same valves 28 and 32 thanks to an appropriate calibration of the spring 30 of the valve 28.

In the specific case of the variant of FIG. 23, provided in the line L, downstream of the compressor 101 is a two-position solenoid valve 106. In one position (illustrated in FIG. 23), the solenoid valve 106 sets the delivery of the compressor 101 in communication with the peripheral lines L1 in order to enable each time a step of inflation of one of the tyres by opening the communications controlled by the solenoid valves 102. In its other position, the solenoid valve 106 sets the lines L1 in communication with an auxiliary line L4 connected to a source of negative pressure (vacuum pump) 107 in order to enable a step of deflation of one or more of the tyres by opening the communications controlled by the solenoid valves 102. The vacuum pump 107 is driven by the electric motor M.

The main difference of the variant of FIG. 24 with respect to that of FIG. 23 lies in the fact that, instead of the vacuum pump 107, there is provided an ejector device 108 including a Venturi duct designed to receive a flow of air from the compressor 101 via a supply line L5 that generates an effect of negative pressure for drawing in air from the auxiliary line L4. In this case, the solenoid valve 106 of FIG. 23 is replaced by a solenoid valve 109 that controls communication through the auxiliary line L4 and by a two-position solenoid valve 110, inserted in the main line L and designed to connect the delivery of the compressor 101 selectively to the peripheral lines L1 or to the line L5 for supply of the Venturi duct.

In both of FIGS. 23 and 24, the block E designates an electronic control unit, which receives the signals at output from the pressure sensors 103 and is designed to control operation of all the solenoid valves of the system and of the electric motors M for driving the compressor 101 and the vacuum pump 107. The control unit E is programmed according to pre-set logics to implement the various operating steps of the system, taking into account the pressure signals at output from the sensors 103.

When the electronic control unit E has to implement a step of inflation of one or more tyres, it brings about closing of the venting solenoid valve 105 and opening of the corresponding solenoid valves 102 along the respective peripheral lines L1 and connects these peripheral lines L1 to the delivery of the compressor 101 by keeping the solenoid valve 106 in the resting position (in the case of the variant of FIG. 23) and by keeping the solenoid valves 110 and 109 (which are normally closed) in the resting position (in the case of the variant of FIG. 24). The control unit E drives the compressor 101 so that the pressurized air coming from the compressor 101 flows through the main line L, through the peripheral lines L1 for which the solenoid valves 102 are open, and through the respective pneumatic rotary joints T and TR, and reaches the plenums P and PR of the respective wheels. From each plenum P, PR the air flows through the respective line L3 and the respective one-way valve 32, and reaches the inner chamber C of the tyre. The electronic unit E stops the compressor 101 and closes the solenoid valves 102 once a pre-set pressure value in the tyres is reached. At the end of actuation, the valve 105 opens again, after arrest of the compressor 101 and before closing of the solenoid valve 102, so as to enable depressurization of the stretch comprised between the solenoid valve 102 and the valves 28 and 32, i.e., the stretch that includes the pneumatic rotary joint T, TR.

When the electronic control unit E has to implement a step of deflation of one or more tyres, it brings about displacement of the solenoid valve 105 into the closing position at the start of actuation and its return into the open position after disconnection of the line L1 from the vacuum pump 107 and before closing of the valve 102. To carry out deflation, the electronic control unit E brings about opening of the corresponding solenoid valves 102 along the respective peripheral lines L1 and connects these peripheral lines L1 to the auxiliary line L4, via switching of the solenoid valve 106 (in the case of the variant of FIG. 23) and via switching of the solenoid valve 109 and 110 (in the case of the variant of FIG. 24). The control unit E drives the vacuum pump 107 (in the case of FIG. 23) or the compressor 101 (in the case of FIG. 24) to generate a value of negative pressure in the line L1 sufficient to create a pressure differential between the stretches upstream and downstream of the valve 28 such as to force the calibrated spring 30 and bring the valve 28 into the opening position. Given that at this point in the inner chamber C there is a pressure higher than the pressure in the line L1, an outgoing air flow is generated that is conveyed and expelled via the vacuum pump 107.

The air present in the inner chamber C of each tyre for which the solenoid valve 102 is open is thus discharged through the line L2 and the respective one-way valve 28 and reaches the plenum P or PR of the respective wheel. From this plenum the air is discharged through the respective pneumatic rotary joint T or TR, and through the respective solenoid valve 102, and reaches the main line L, from which it is discharged into the auxiliary line L4 and then vented into the external atmosphere. The electronic unit E stops the vacuum pump 107 (in the case of FIG. 23) or the compressor 101 (in the case of FIG. 24) and closes the solenoid valves 102 once a pre-set pressure value in the tyres is reached. The calibrated spring 30 of the one-way valve 28 ensures that in any case, within the inner chamber C of a tyre, the pressure value will not drop below a minimum safety threshold.

Calibration of the spring 30 is chosen so as to make it possible to:
   open the valve 28 during deflation by connection to the vacuum generator;
   keep the valve 28 closed when, upstream thereof, i.e., in the line L1, there is present atmospheric pressure (i.e., in the resting condition of the system or in the case of damage to members upstream of the valve itself); and
   keep the valve 28 closed if the system were to be actuated for deflation (connection to the vacuum generator) and in the tyre there were present a pressure lower than or equal to a minimum desired pressure.

It should be noted that, thanks to the presence of the normally closed solenoid valve 102 that keeps the line L1 isolated from the main line L, the valve 28 does not limit the maximum operating pressure of the tyre in the conditions where the pressure within the inner chamber C is higher than the calibration pressure of the spring 30 and the system is in the resting condition. It will hence be possible to obtain within the inner chamber C a pressure higher than the calibration pressure of the spring 30 by actuating the system: during inflation of a tyre, in fact, the pressure in the plenum P will always be higher than the pressure in the inner chamber C of the tyre; hence the valve 28 will remain closed and the air will be able to flow regularly through the valve 32. At the end of actuation, in this case, the control unit E will have to close the solenoid valve 102 before carrying out opening to the atmosphere by switching the valve 105. In the case where, in resting conditions of the system, the operating pressure in the inner chamber C of the tyre were to be higher than the calibration pressure of the spring 30 and damage were to occur to the members set along the line L1, calibration of the spring 30 will guarantee maintenance of a minimum pressure in the tyres equal to the calibration pressure of the spring. Calibration of the spring 30 hence enables limitation, in any operating condition, of the minimum pressure within the tyre and identification of an optimal pressure range where the system guarantees depressurization of the line L1 in resting conditions, without, however, any limitation of the maximum operating pressure so as to enable a wider margin in the selection of the target pressure. On the other hand, limitation of the maximum pressure that can be obtained in the tyre during inflation of a tyre is obtained thanks to the valve 104, appropriately calibrated, taking into account the head losses along the lines L, L1, L3.

Configuration of the Connection Between the Pneumatic Rotary Joint and the Wheel Plenum and of the Connection Between the Wheel Plenum and the Inner Chamber of the Tyre In what follows, some preferred embodiments of the invention will be illustrated with reference in particular to the configuration of the connection between each pneumatic rotary joint and the plenum of the respective wheel and to the connection of this plenum to the inner chamber of the tyre.

The configuration proposed is different for driving wheels and for non-driving wheels, and may moreover vary for each wheel according to whether it is possible to have available wheels designed right from the outset for these purposes or whether it is preferred to make use of conventional wheels.

Driving Wheels, with Body Having a Non-Conventional Configuration

FIGS. 1-9 illustrate a first embodiment of the system according to the invention, with reference to a driving wheel W (in the specific example, a steering wheel) having a single body made of light alloy 26 that integrates the rim, the spokes, and the central body of the wheel, obtained by casting in which, as will be illustrated in detail in what follows, are the passages defining the lines L2, L3 described above, which connect the plenum P of the wheel W to the inner chamber C of the tyre.

Figure 1:
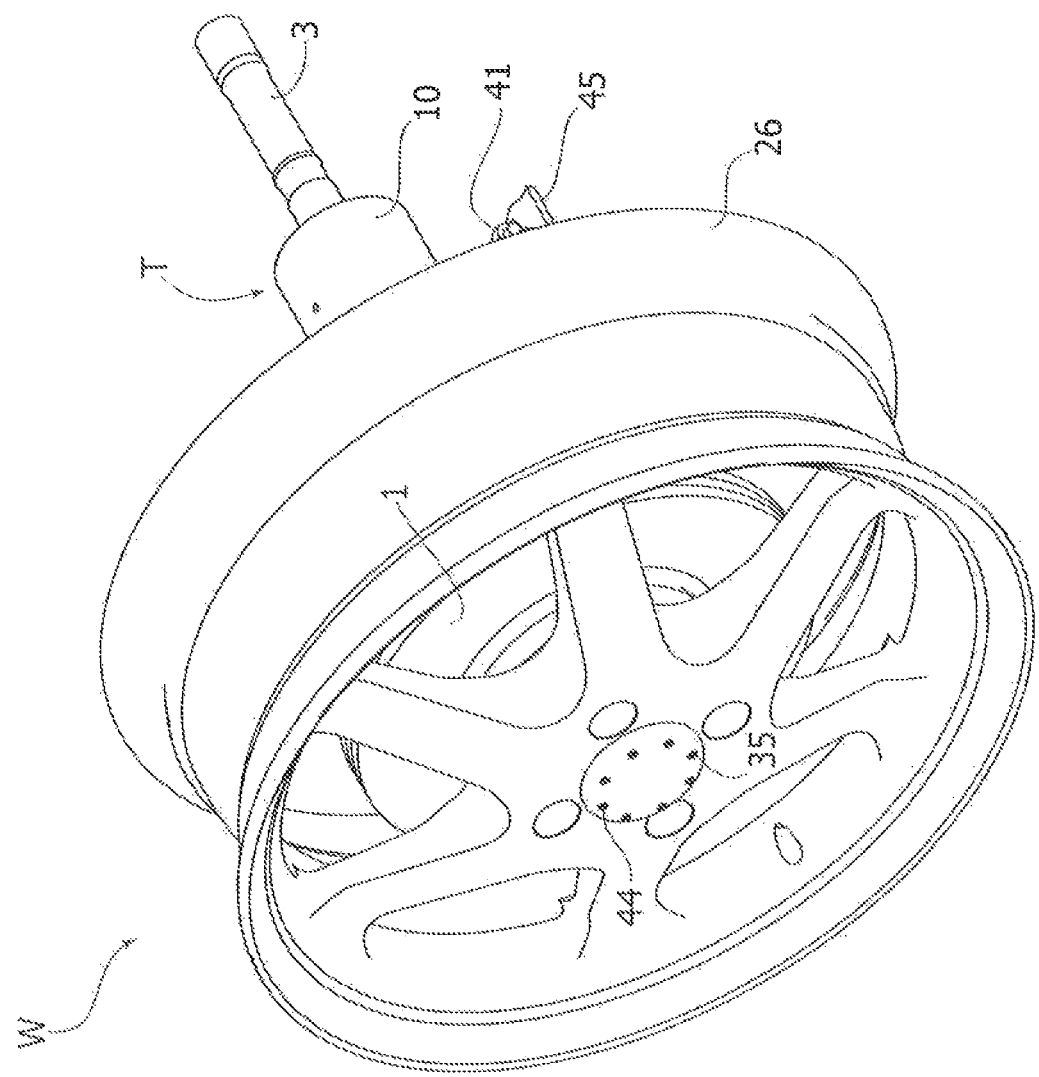
FIG. 1 is a perspective view of a driving wheel of a motor-vehicle with the system installed.

FIG. 1 is a perspective view of the driving wheel W, which receives torque from an axle shaft 3. The details regarding the connection of the axle shaft 3 to the differential of the motor-vehicle, as well as those regarding the suspension of the wheel W are not illustrated herein, in so far as they can be obtained in any known way and in so far as these details, taken in themselves, do not fall within the scope of the present invention. Furthermore, elimination of these details from the drawings renders the latter simpler and easier to understand.

Figure 2:
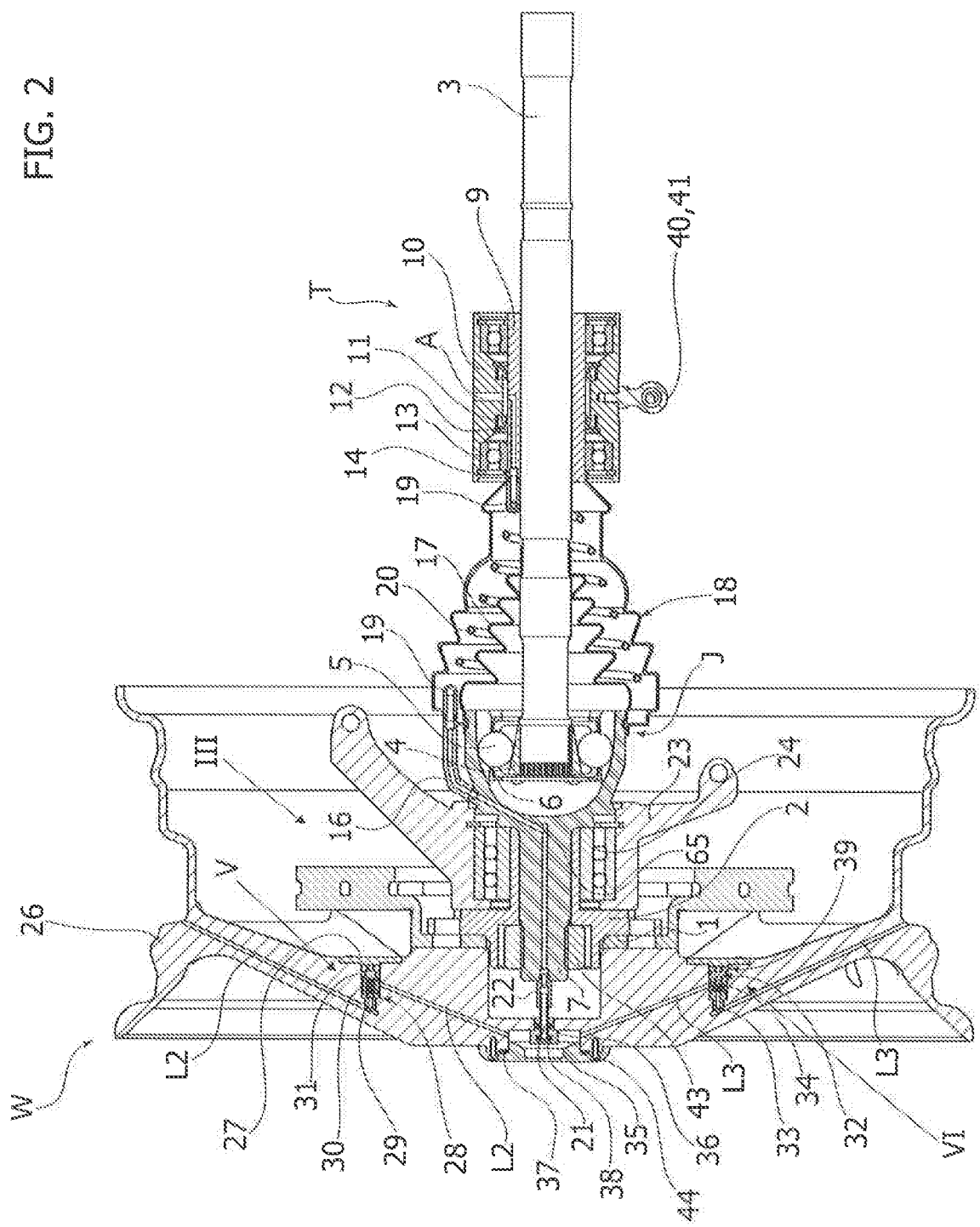
FIG. 2 is a cross-sectional view of the part of the system associated to the driving wheel, according to a preferred embodiment of the invention.

With reference to FIG. 2, the body of the wheel W is connected in the conventional way, by means of screws, to the annular flange of a wheel hub 2. Once again according to the conventional technique, the wheel hub 2 has a tubular cylindrical central body that receives inside it a wheel spindle 7 that is rigidly fastened to the latter by means of a nut 43 screwed on a threaded end portion of the wheel spindle 7. The assembly constituted by the wheel spindle 7 and the central body of the wheel hub 2 is rotatably supported by a wheel support 23 by means of a ball bearing 24, within an opening formed in the wheel support 23.

According to the conventional technique, the wheel support 23 is connected to the elements of the suspension of the wheel W (not illustrated) so as to be able to oscillate about a steering axis of the wheel W (not illustrated herein). The conventional technique described above is similar also in the case of a non-steering driving wheel.

The reference number 1 designates the disk of a disk brake associated to the wheel W. The wheel spindle 7 is connected in rotation to the respective axle shaft 3 via an constant-velocity (CV) joint J. The CV joint J, as illustrated in FIG. 2, is a joint of the Rzeppa type, but any other type of CV joint according to the conventional technique may be used.

The CV joint J has an input member 4 connected in rotation to the axle shaft 3 and an output member rigidly connected to the wheel spindle 7. The CV joint J moreover has inside it a cage 6 containing balls 5. In the embodiment illustrated in FIG. 2, the wheel spindle 7 and the output member of the CV joint J are part of a single body.

Furthermore, once again with reference to FIG. 2, associated to the wheel W is a pneumatic rotary joint T, obtained according to any of the methods known to the prior art, comprising an inner sleeve 9 that surrounds the axle shaft 3 and is connected in rotation thereto, and an outer sleeve 10 supported by the structure of the motor-vehicle 45. The structure 45 is connected to the joint T by means of a retention wire or rigid rod 40 having on each end a ball joint 41, 41 (see FIGS. 2, 7 and 8, 9) in such a way as to allow vertical and axial movements of the axle shaft 3 and consequently of the pneumatic rotary joint T, at the same time constraining the sleeve 10 in rotation. The inner sleeve 9 is rotatably mounted via rolling bearings 13 provided with elastic retention rings 14 within the outer sleeve 10. The inner sleeve 9 is constrained to the axle shaft by splining or by interposition of compensation rings or with any method known from the conventional technique.

The outer sleeve 10 of the pneumatic rotary joint T has an inlet opening A, mounted within which is an inlet fitting (not illustrated) for connection to the respective peripheral line L1 (FIGS. 23 and 24) of the air-supply circuit, already described above. The inner sleeve 9 has in turn an outlet fitting 19 (illustrated in FIGS. 2 and 8). Furthermore, the references 11, 12 designate a lip-seal ring and the respective elastic retention ring.

Figure 3:
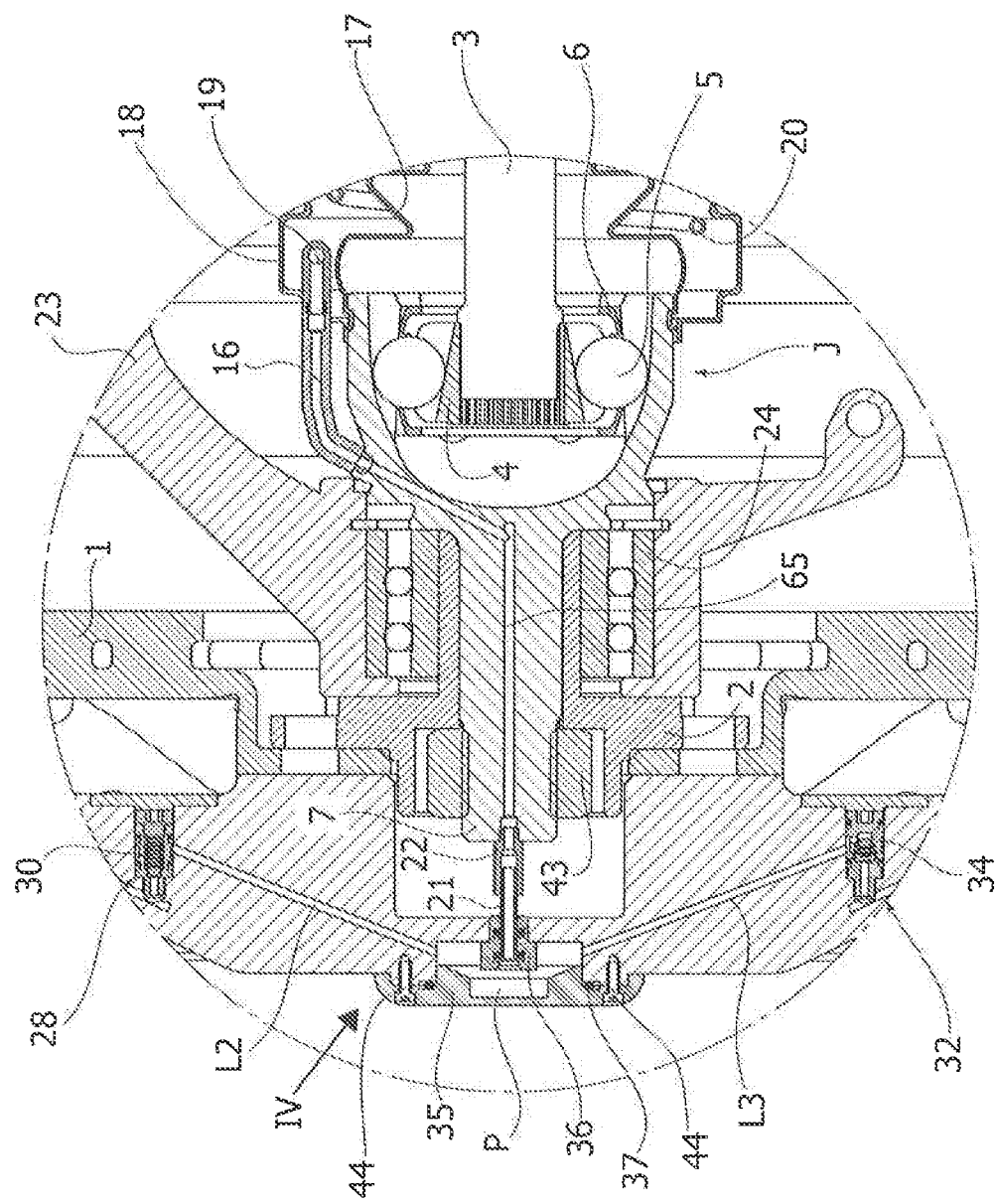
FIG. 3 is a view, at an enlarged scale, of the details denoted by the reference III in FIG. 2.
Figure 4:
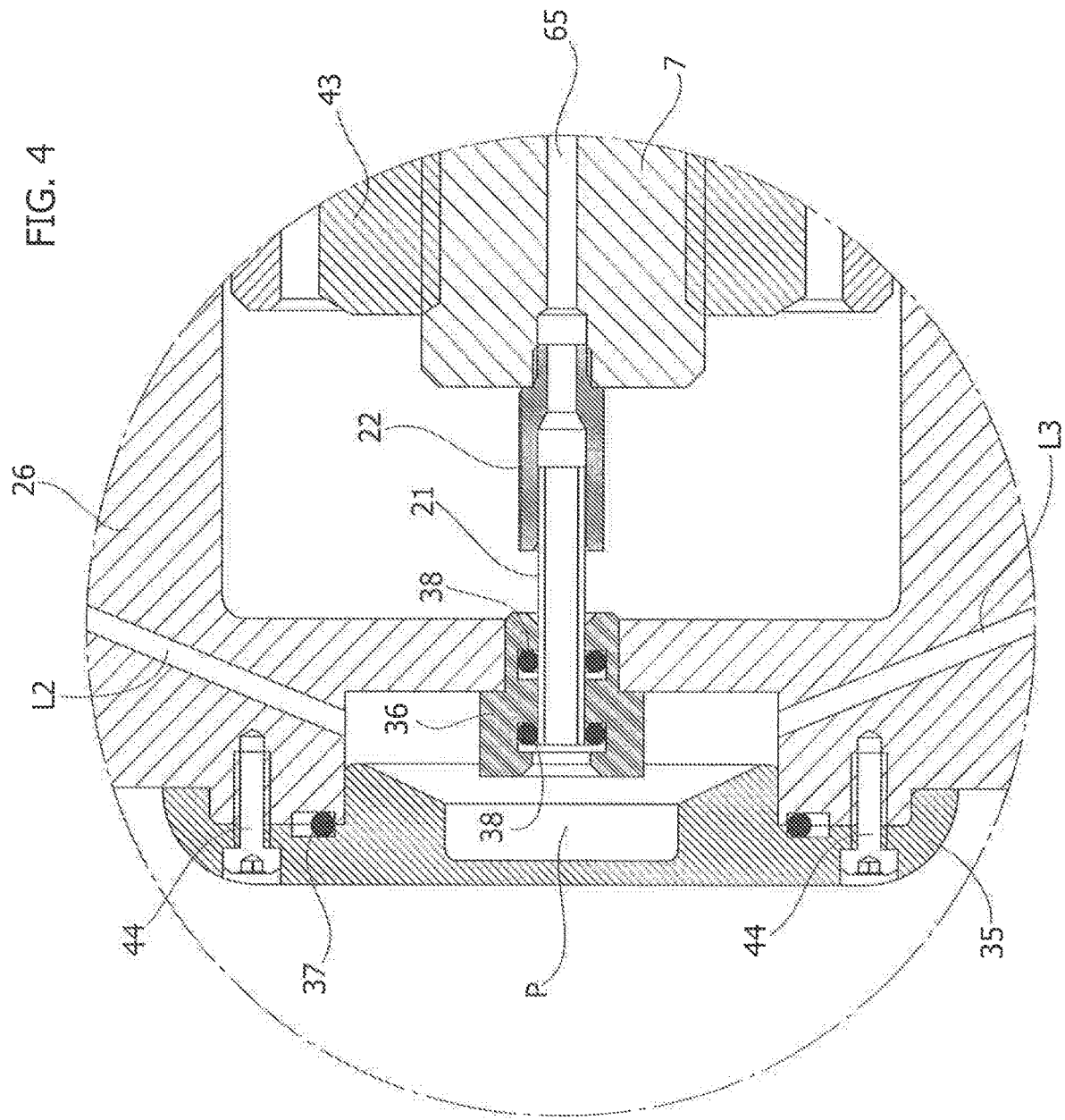
FIG. 4 is a view, at an enlarged scale, of the details denoted by the reference IV in FIG. 3.

As illustrated in FIGS. 2 and 3 by means of a view at an enlarged scale, the wheel spindle 7 is traversed by an internal duct 65 for the passage of air. The internal duct 65 has a portion defined by a bore which extends axially throughout the length of the wheel spindle 7 and a second portion that branches off radially from the first portion through the body of the output member of the CV joint J. In a variant not illustrated herein, the wheel spindle 7 and the output member of the CV joint J are constituted by separate elements, connected together.

Figure 7:
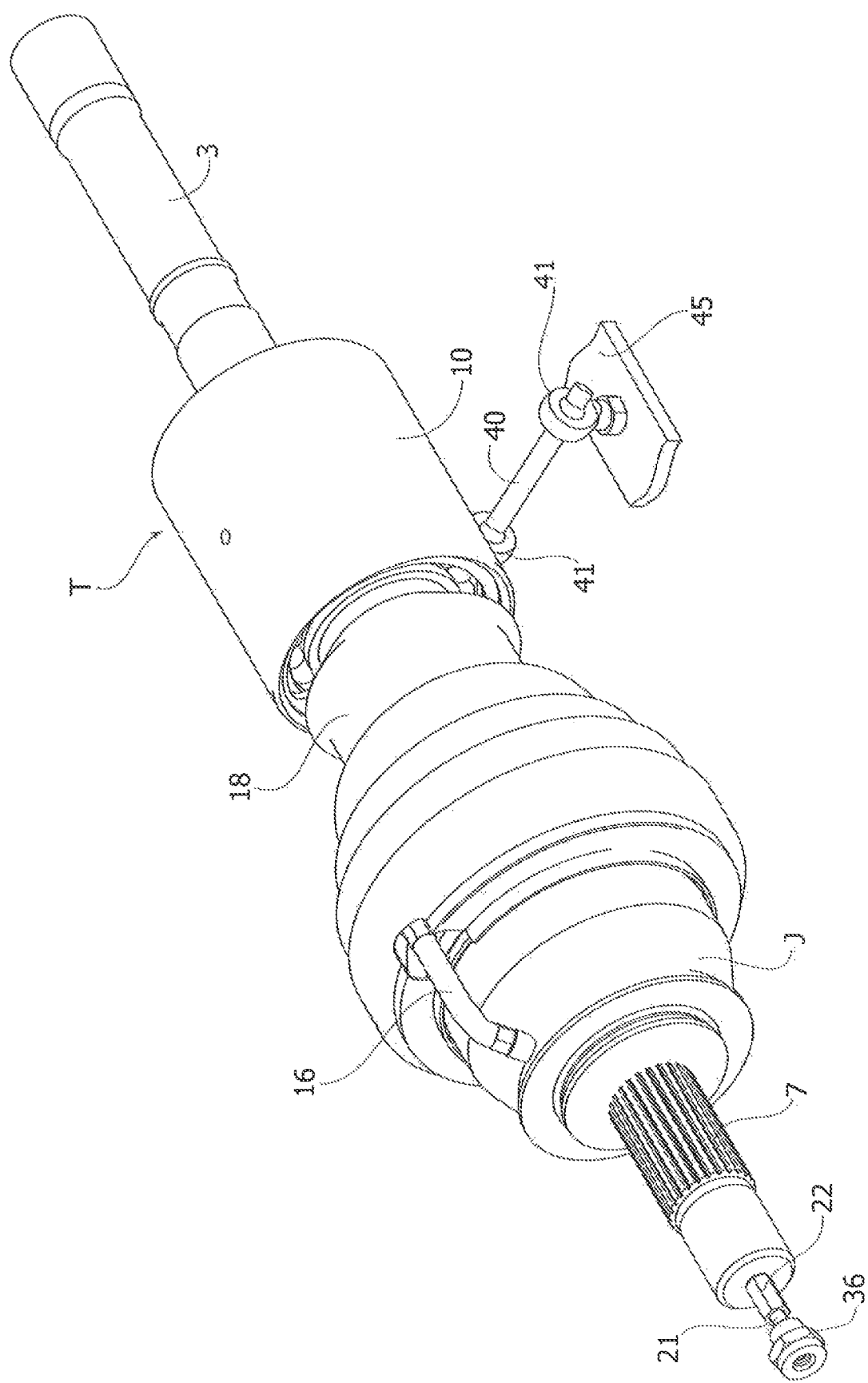
FIGS. 7 and 8 are perspective views of some parts of the system illustrated in FIG. 2.
Figure 8:
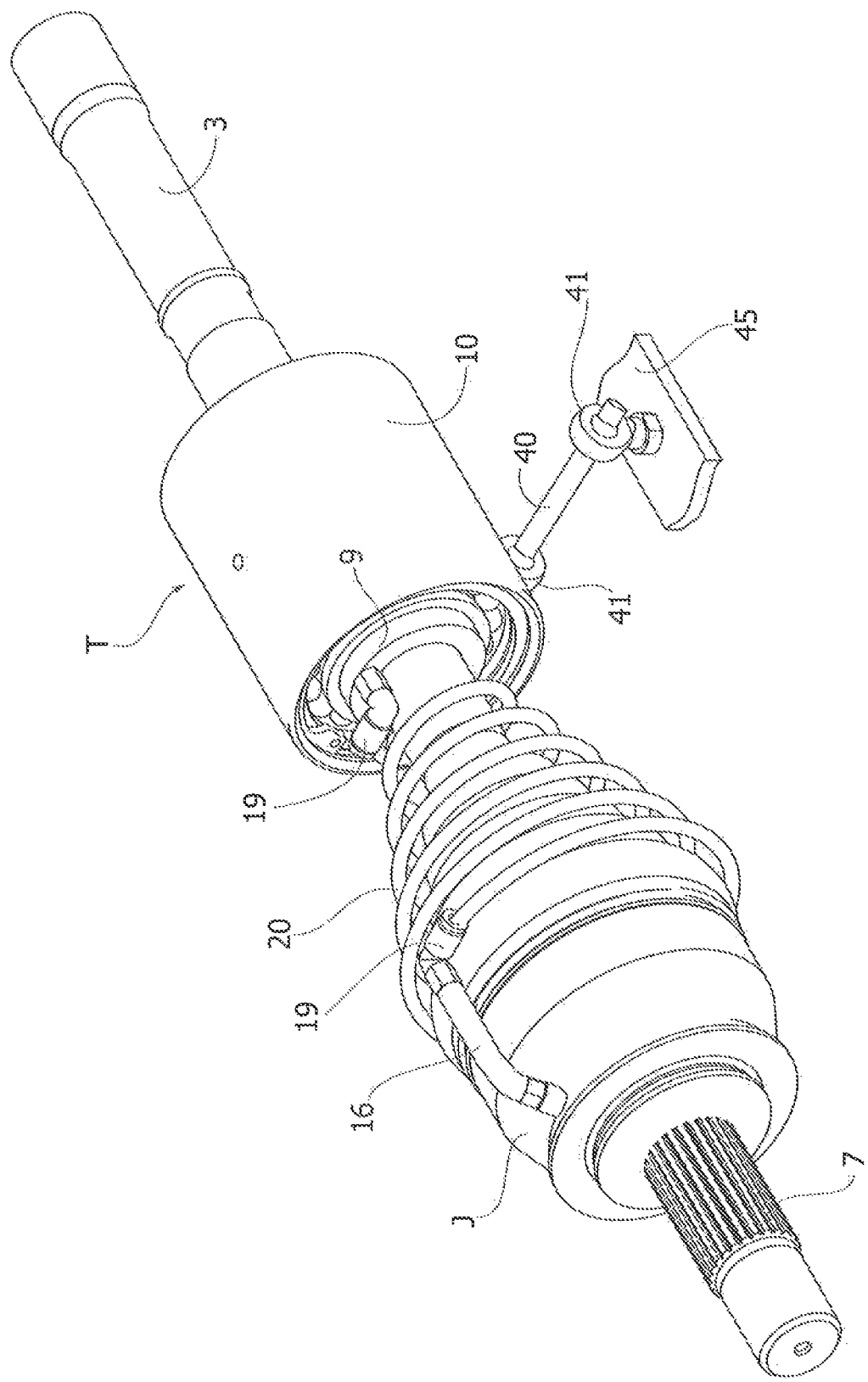
Figure 9:
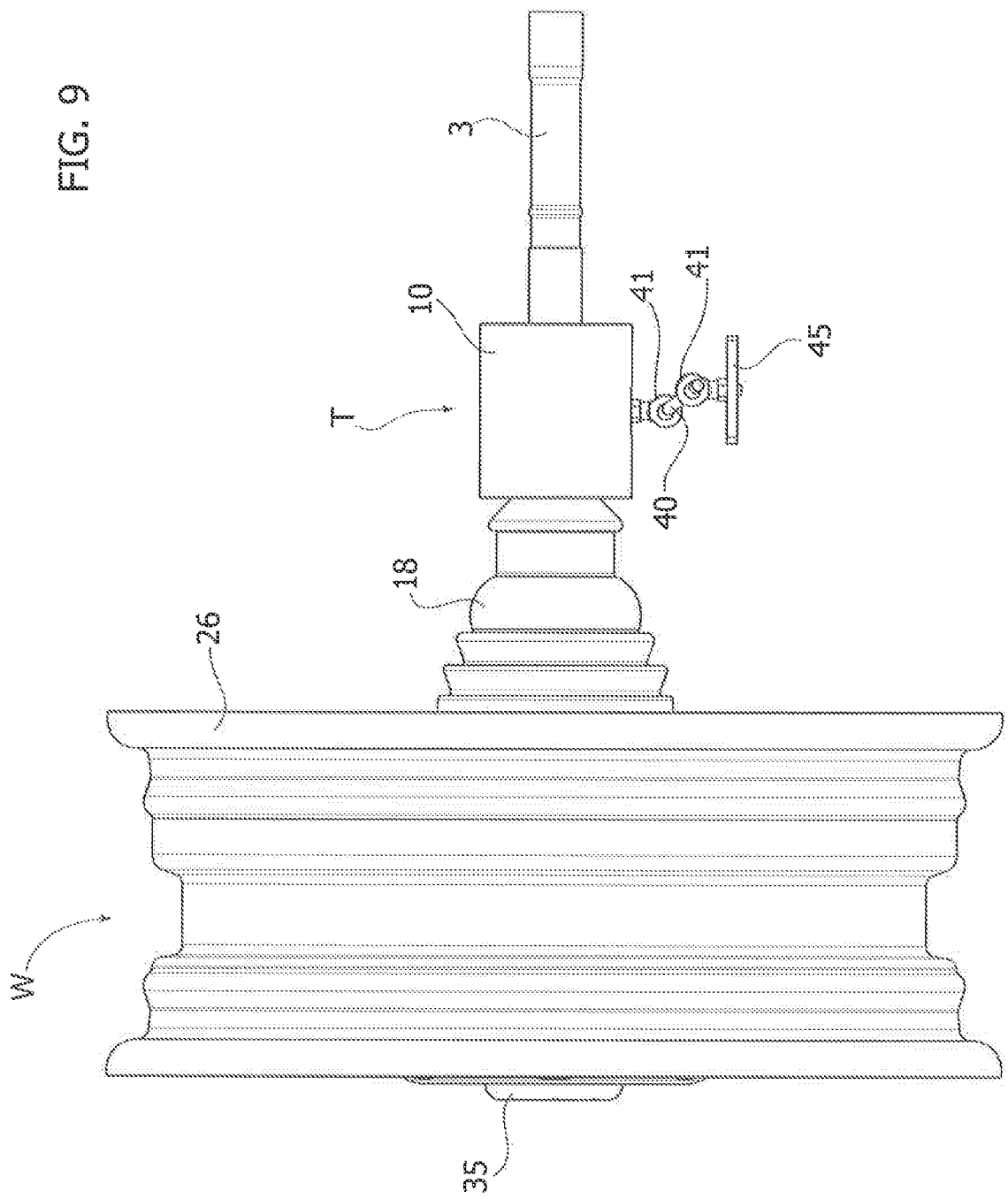
FIG. 9 is a front view of the details illustrated in FIG. 1.
Figure 10:
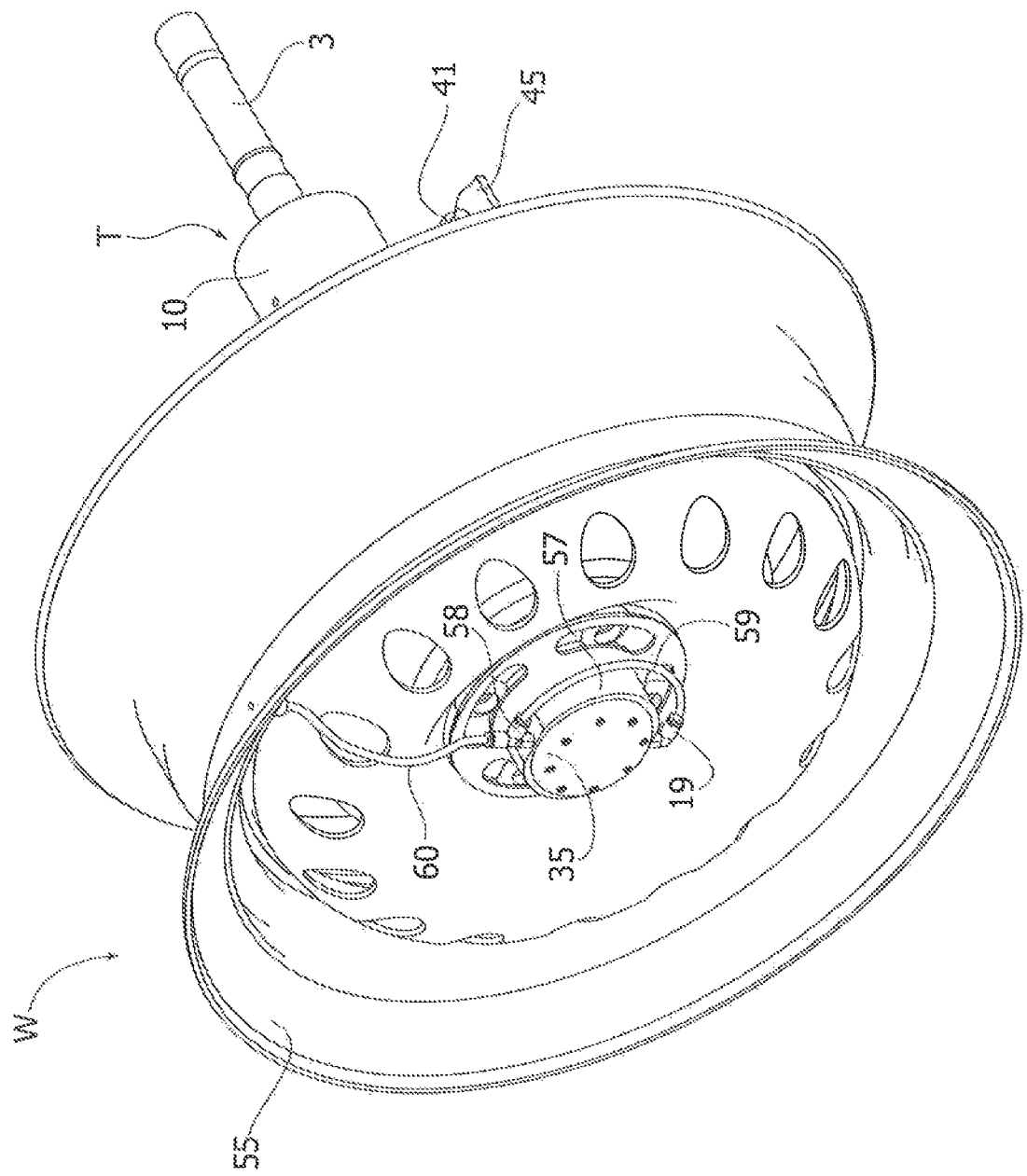
FIG. 10 is a perspective view of a driving wheel of a motor-vehicle with the system installed, according to an embodiment alternative to the one illustrated in FIG. 1, which calls for to the presence of an accessory member.
Figure 11:
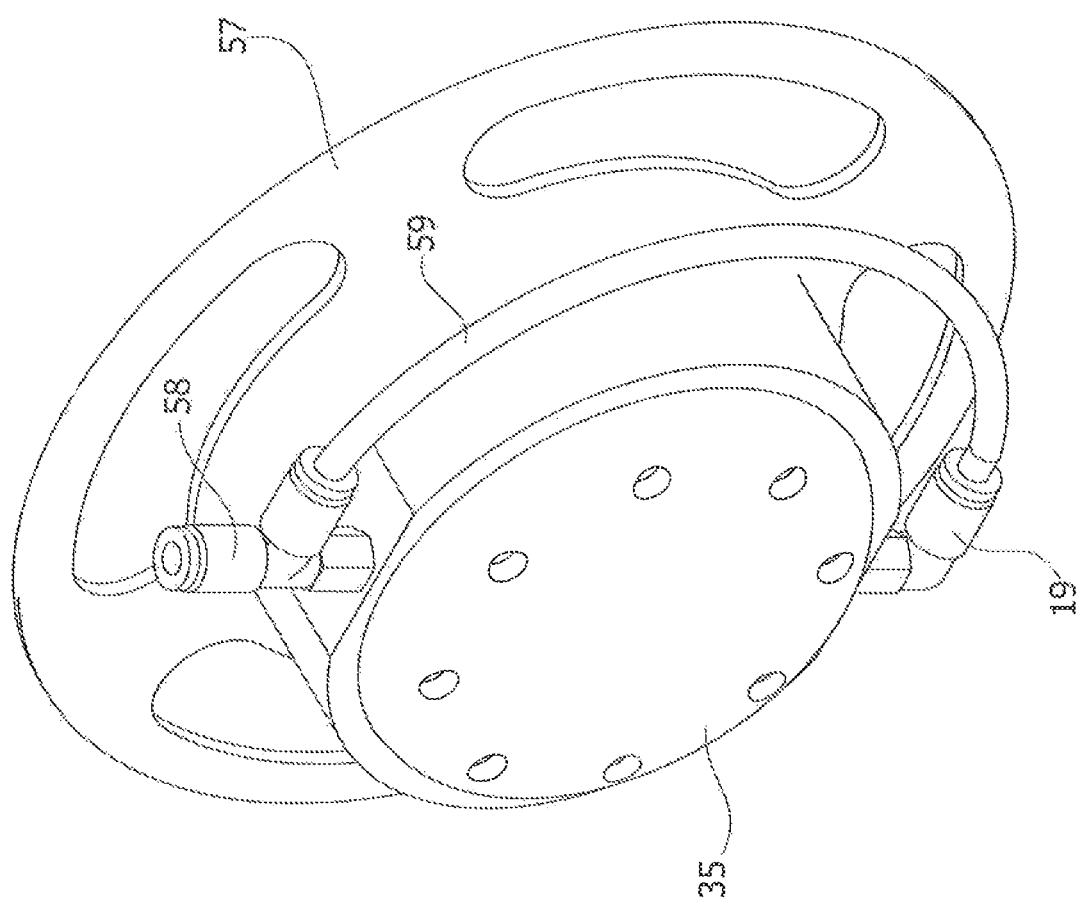
FIG. 11 is a front perspective view of the accessory member of FIG. 10.
Figure 12:
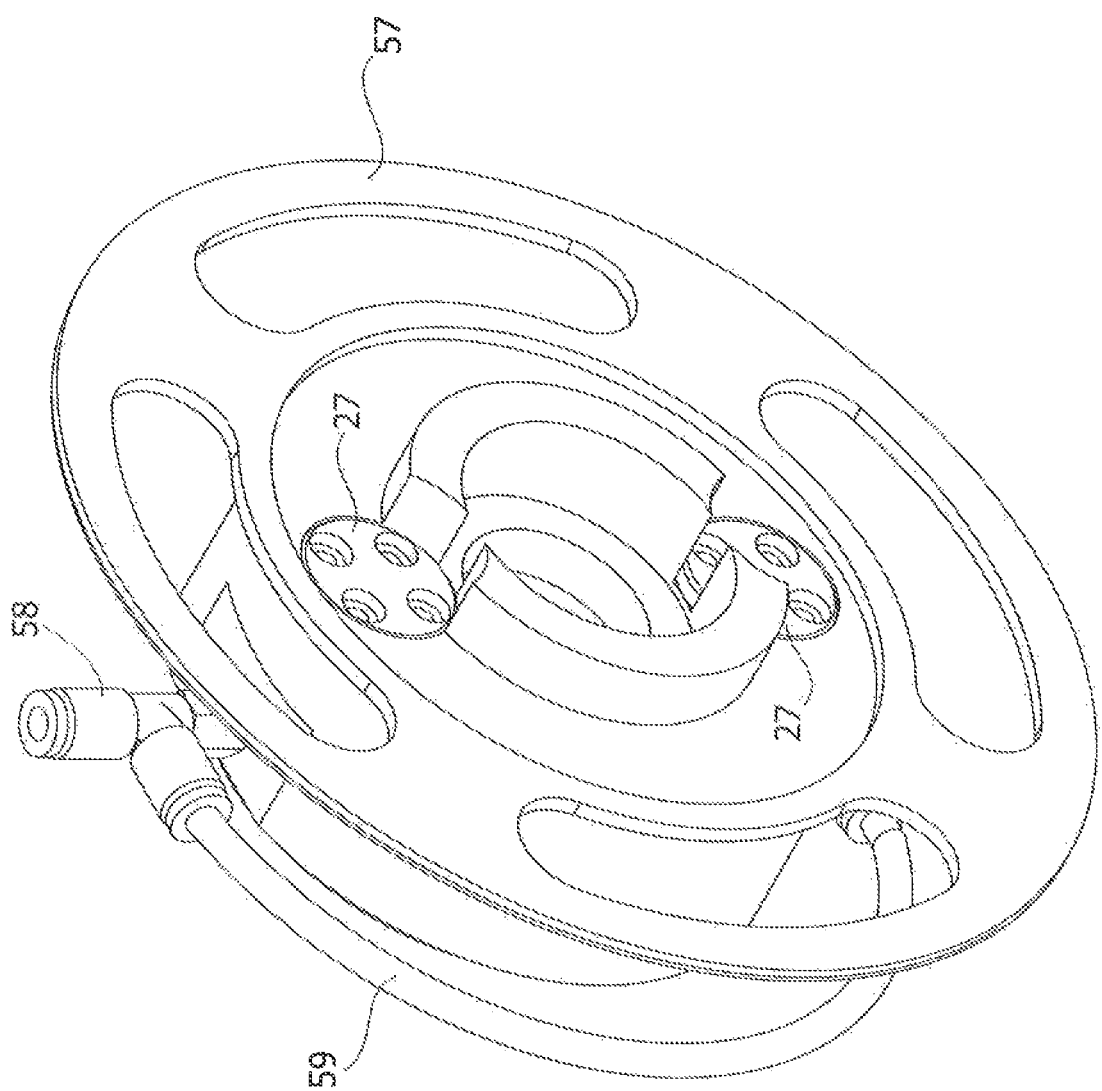
FIG. 12 is a rear perspective view of the accessory member of FIGS. 10 and 11.

Once again with reference to FIGS. 2 and 3, the internal duct 65 has a first end giving out onto the outer surface of the output member of the CV joint J. This end is connected to a rigid tube 16. At the end located on the opposite side with respect to the duct 65, the rigid tube 16 is connected to a flexible hose 20 having a helical shape (illustrated also in FIG. 8) by means of a connection 19, which is hence set between the rigid tube 16 and the helical hose 20. Consequently, the connection between the outlet fitting 19 of the pneumatic rotary joint T and the first end of the internal duct 65 is obtained by means of the helical hose 20, inside which the air flows. According to the embodiment illustrated herein, the flexible hose 20 has a helical shape, in such a way as to be wound around a boot 17 of the axle shaft 3. The flexible hose 20 may be made of any plastic material having adequate anti-corrosion properties given that it is set in a position exposed to dirt and atmospheric agents. The configuration described of the connection hose 20 allows for complete functionality of the system forming the subject of the invention, guaranteeing regular operation of the CV joint J, and moreover enables reduction of displacements of the hose 20 due to the centrifugal force. Furthermore, as illustrated in FIGS. 2 and 7, the hose 20 is entirely covered by a secondary boot 18. The configuration described regarding the duct 65 obtained within the CV joint J and the corresponding connections to the pneumatic rotary joint T enable installation of the system on board the vehicle without modifying the general architecture of the wheel, transmission, and suspension assemblies, and minimizing the modifications on the conventional components. This solution hence leads to advantages over the prior art.

With reference to FIG. 3, the internal duct 65 has a second end that gives out onto the outer end surface of the wheel spindle 7 and communicates with the plenum P of the front wheel W. As may be seen more clearly in the view, at an enlarged scale, of FIG. 4, the plenum P of the front wheel W is a cavity formed in the front surface of the wheel W and closed by a cover 35 having a seal ring 37 and removably fastened to the wheel W by means of fixing screws 44. In the embodiment illustrated herein of the system according to the invention, the second end of the internal duct 65 for the passage of air is connected to the plenum P by means of a tubular connection element 21. The tubular connection element 21 has a first end sealingly connected to the second end of the internal duct 65 and has a second end that gives out into the plenum P of the wheel W. Once again with reference to FIG. 4, the first end of the tubular connection element 21 is rigidly constrained within a tubular connection member 22 screwed within a threaded portion of the second end of the internal duct 65 for passage of air. The second end of the tubular connection element 21, which gives out into the plenum P of the wheel W, is received through a hole formed in a front wall of the wheel W that constitutes the bottom of the cavity defining the plenum P. The tubular element 21 is received through the above hole with interposition of a tubular supporting sealing member 36 that is screwed within the hole formed in the wall defining the plenum P. Inserted into the tubular supporting sealing member 36 are two seal rings 38 or a deformable ogival cap made of plastic material (for example, nylon) appropriately compressed in the assembly stage.

Thanks to the description presented above, unlike the known systems discussed previously, the system according to the invention manages to achieve the target of an on-board centralized control of the pressure of the tyres, without rendering the operations of installation and removal of the wheels more complex and laborious. When the wheel has to be removed, the cover 35 is dismantled and the tubular supporting sealing member 36 is unscrewed. Once the wheel has been removed by disconnection of the wheel from the flange of the hub 2, the tubular element 21 remains connected to the end of the wheel spindle 7. When the wheel has to be mounted, the tubular supporting sealing member 36 is not initially present on the wheel, so that the hole formed in the wall defining the plenum P can be easily centred around the tubular element 21. After connection of the wheel to the wheel hub 2, the tubular supporting sealing member 36 can be fitted around the tubular element 21 and screwed within the threaded hole formed in the wall defining the plenum P, after which the cover 35 can be put back on.

With reference to FIG. 3, the plenum P of the front wheel W is connected to the inner chamber C of the tyre of the wheel W by means of the two connection lines L2, L3, which have already been described above and are set in parallel to one another, for deflating and inflating, respectively, the tyre and interposed in which are the one-way valves 28, 32.

The preferred embodiment of the system according to the invention envisages that the connection lines L2, L3 are defined by passages obtained by casting in the body of the wheel made of light alloy. Each connection line L2, L3 houses the seat for the respective one-way valve 28, 32.

As illustrated in FIGS. 3-6, the connection lines L2, L3 each have a first stretch, which extends radially from the plenum P to the seat of the respective valve 28, 32, and a second stretch, which is axially staggered with respect to the first stretch and extends radially from the seat of the respective valve 28, 32 until it gives out onto the peripheral outer surface of the wheel rim, in communication with the inner chamber C of the tyre.

Figure 5:
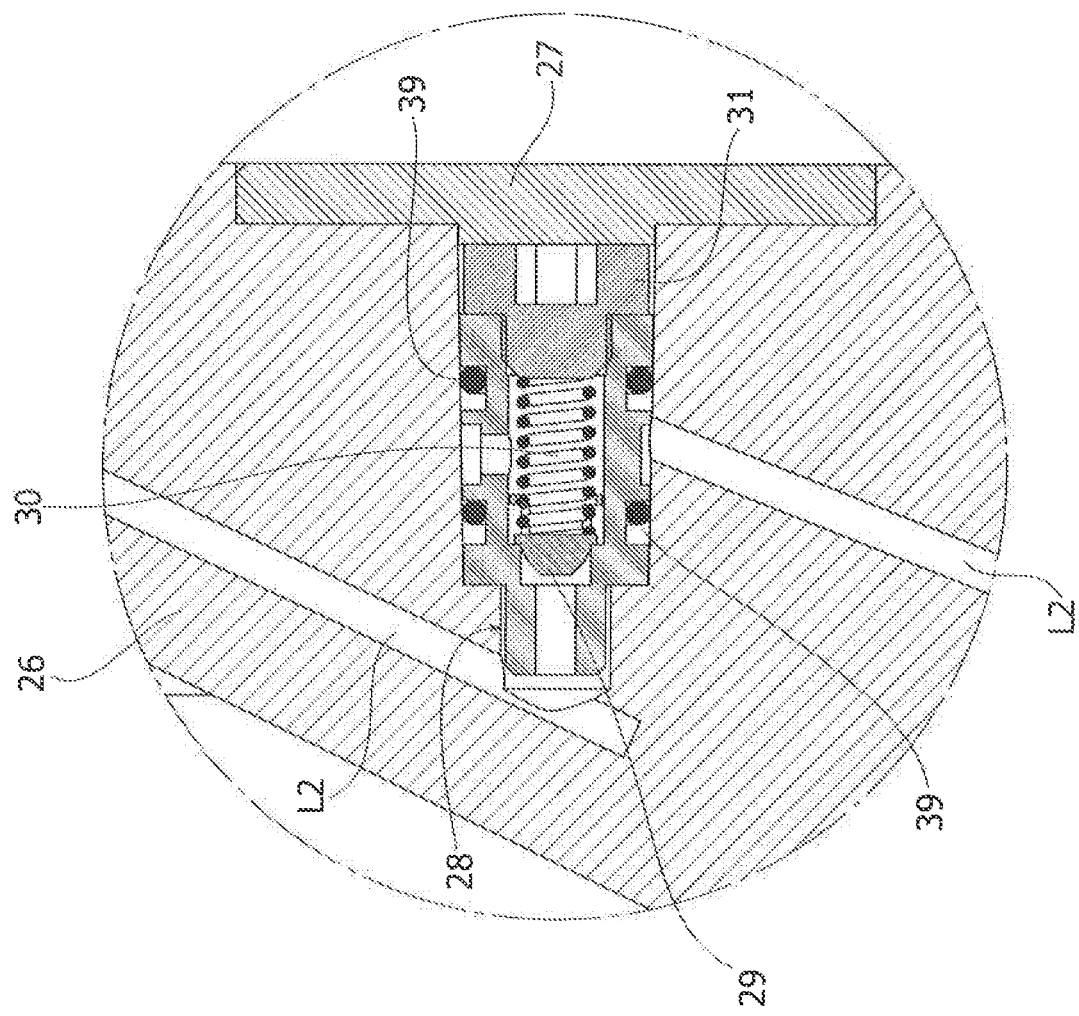
FIGS. 5 and 6 are views, at an enlarged scale, of the details denoted by the references V and VI in FIG. 2.
Figure 6:
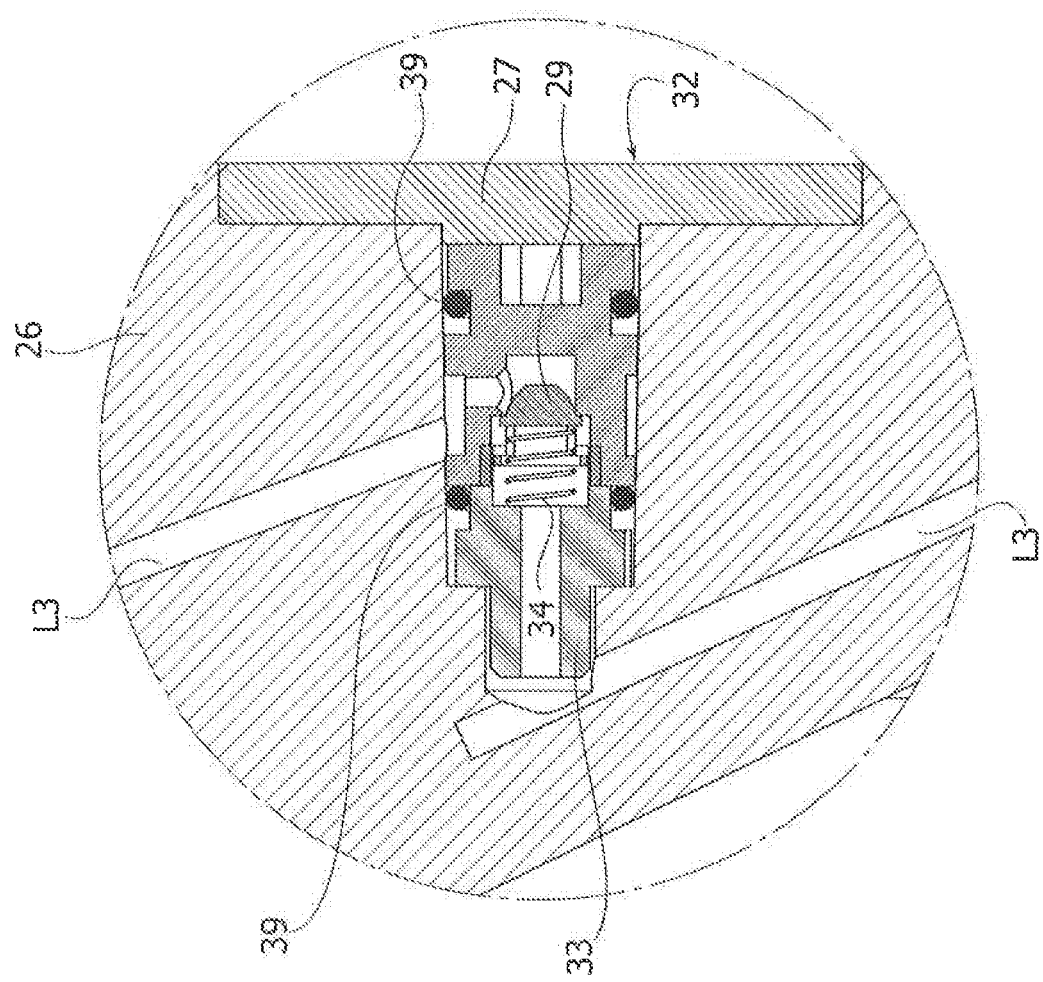

FIGS. 5 and 6 illustrate, respectively, the one-way valve 28 for deflation of the tyre of the wheel W and the one-way valve 32 for inflation of the tyre of the wheel W. The valves 28, 32 are received in seats formed in the body of the front wheel W. Once again with reference to FIGS. 5 and 6, these seats are prearranged in such a way that the one-way valves 28, 32 are oriented with their own main axis parallel to the axis of the front wheel W. This prevents the mobile members of the valves 28, 32 from being affected by the centrifugal force generated by rotation of the wheel W.

The seats of the one-way valves 28, 32 are configured in such a way as to house pre-assembled valve blocks, each having an open/close element 29 recalled into the resting and closing position by a spring, designated by the references 30, 34 for the one-way valves 28, 32, respectively. The valves 28, 32 are each made up of a main body and a valve cap, designated, respectively, by the references 31, 33. The one-way valves 28, 32 comprise, respectively, also two seal rings 39, installed directly on the bodies of the two valves 28, 32, which guarantee tightness between the one-way valve 28, 32 and its seat, preventing any seepage of air coming out of the tyre, separating the inlet and outlet environments from the valve and creating an annular inner chamber that communicates with the lines L2, L3. Each of the seats of the one-way valves 28, 32 is closed by a removable cover 27, preferably fastened to the spokes of the rim of the wheel W by means of fixing screws (here not illustrated). The return spring 30 associated to the valve 28 has a load determined in such a way as to guarantee a pre-set minimum value of the pressure in the inner chamber of the tyre. In this way, the pressure in the chambers C of the tyres can never drop below a pre-set minimum value, even in the case of failure of the system, thus guaranteeing total safety.

In the embodiment according to the invention illustrated herein, the two one-way valves 28, 32 are set in two different seats obtained in two different spokes of the rim of the wheel W so as to allow a better distribution of the weights and a lower impact on the aesthetics of the wheel W. In another embodiment of the system according to the invention, the body of each valve 28 and 32 is formed directly in the body of the wheel W.

Driving Wheels with Conventional Standard Structure

FIGS. 10-17 illustrate application of the system according to the invention to a driving wheel W (in the specific example, a steering wheel) having a steel-plate structure, with conventional standard configuration. The differences from the solution described previously for the wheel made of light alloy with non-conventional configuration regard the configuration of the components downstream of the CV joint J. Furthermore, the configuration of the parts that will be described hereinafter with reference to FIGS. 10-17 is the same also in the case of a non-driving wheel.

Figure 13:
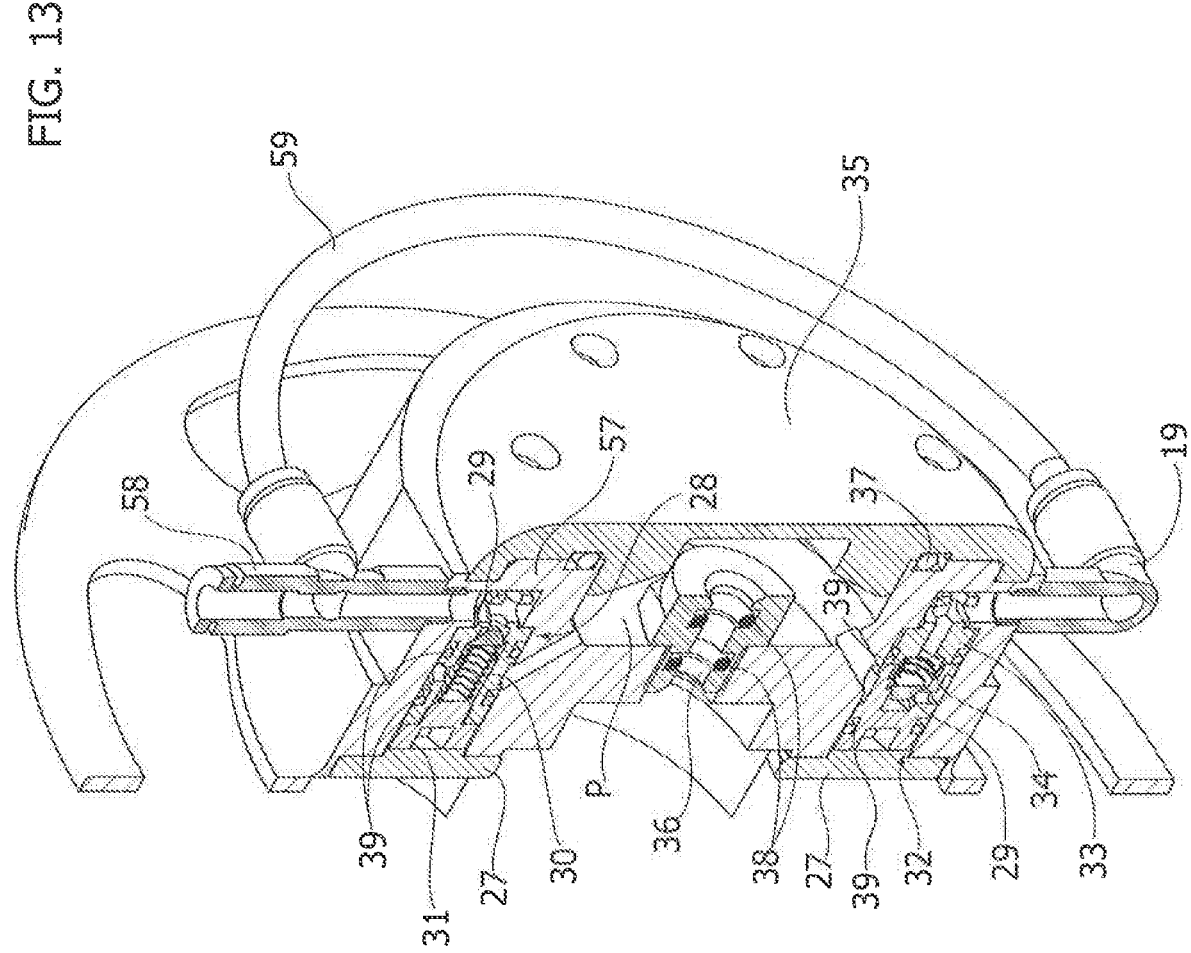
FIG. 13 is a sectioned perspective view of the detail illustrated in FIGS. 10-12.
Figure 14:
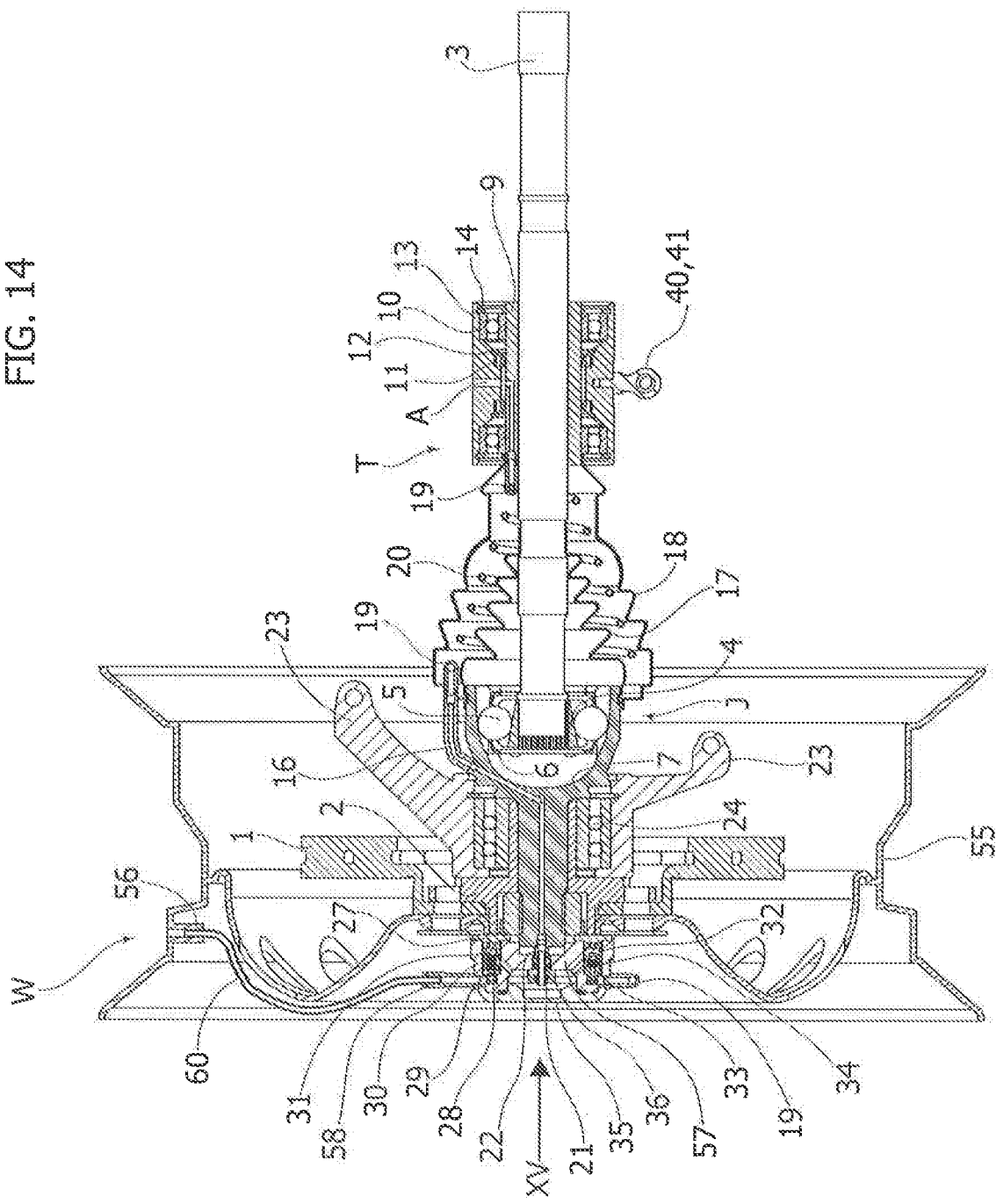
FIG. 14 is a cross-sectional view of the part of the system associated to the driving wheel, according to an embodiment alternative to the one illustrated in FIG. 2.
Figure 15:
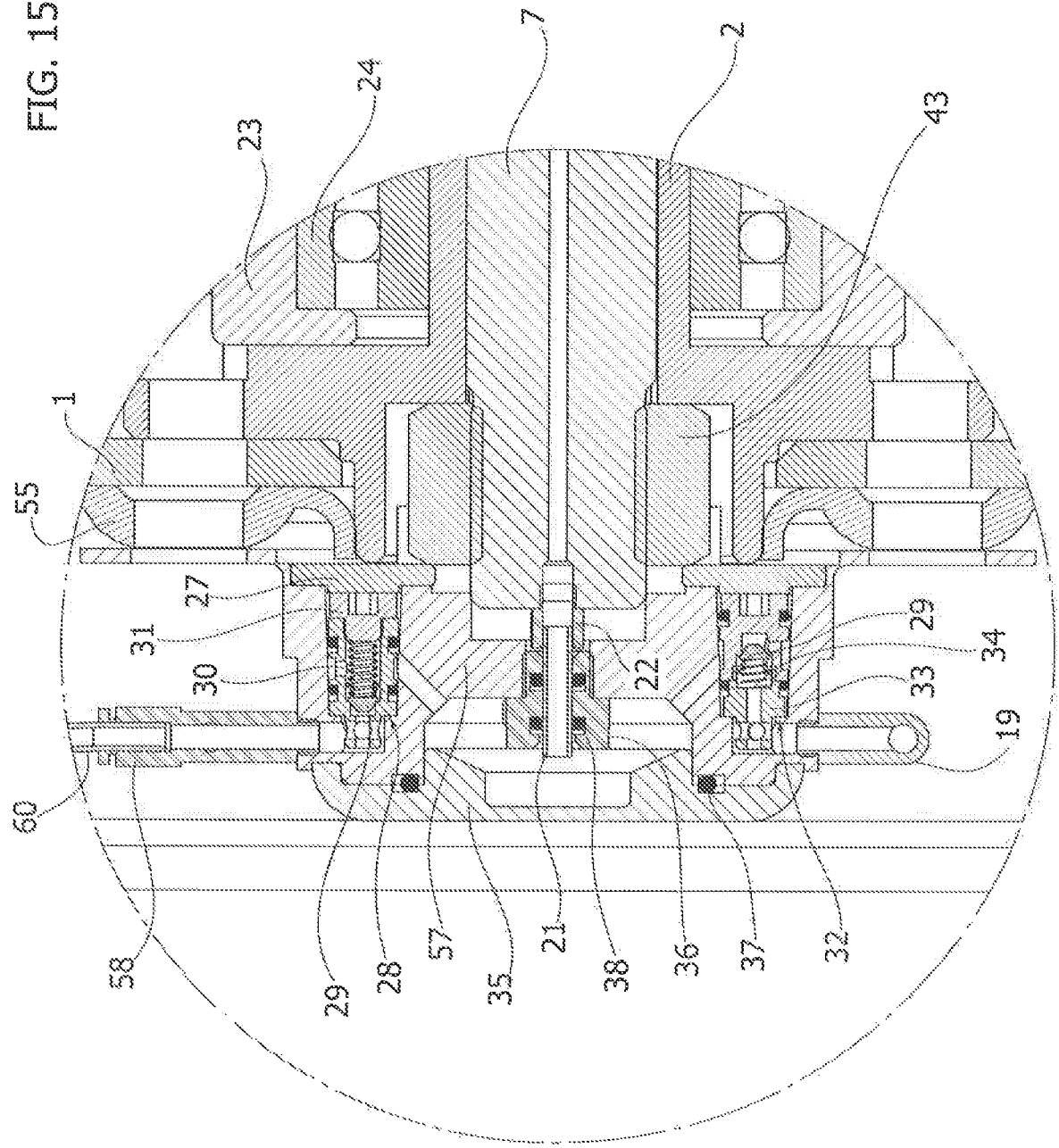
FIG. 15 is a view, at an enlarged scale, of the details denoted by the reference XV in FIG. 14.
Figure 16:
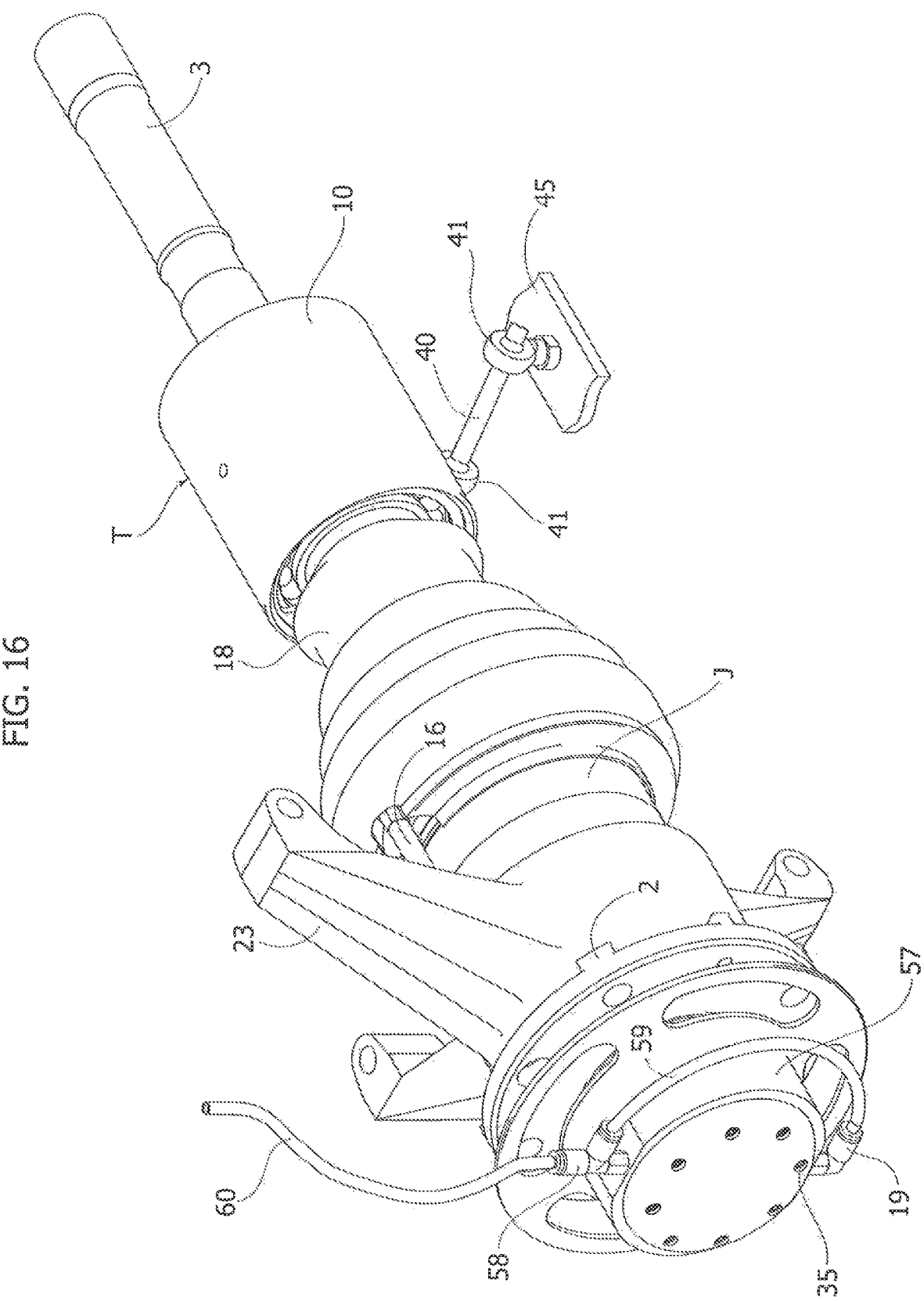
FIGS. 16 and 17 are two perspective views of parts of the system illustrated in FIG. 14.
Figure 17:
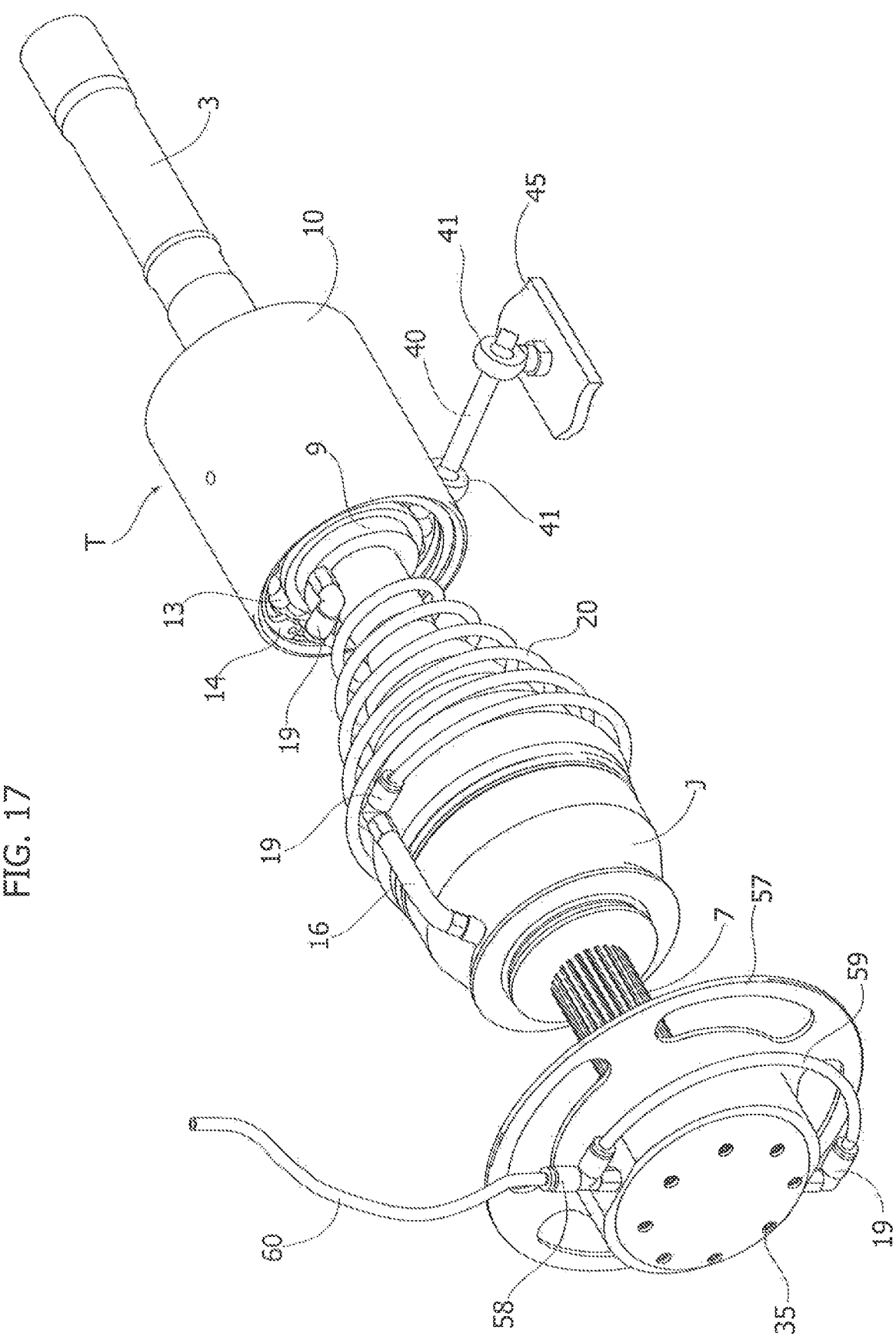

With reference to FIGS. 10-17, associated to the motor-vehicle driving wheel W with rim 55 made of steel plate with standard configuration is an accessory member 57 having inside it the seats for the one-way valves 28, 32 described previously. The accessory member 57 has a disk-shaped body, integrated inside which is the plenum and which is connected to the tubular element 21 described previously (illustrated in FIG. 15). The accessory member 57 moreover has inside it the tubular supporting sealing member 36 described previously and the corresponding seal rings 38 (or the respective deformable ogival cap). Consequently, the connection between the plenum and the tubular member 21 is similar to what has been seen in the solution described previously for the wheel W made of light alloy of non-conventional configuration. As illustrated in FIGS. 14, 16, and 17, all the parts of the system that are upstream of the tubular element 21 are similar to what has been described and illustrated previously in FIGS. 1-9, regarding the wheel W made of light alloy with non-conventional configuration. Once again with reference to FIG. 13, the tubular element 21 communicates with the plenum P that is provided within the accessory member 57 and is closed by the cover 35. In the embodiment illustrated here, obtained within the accessory member 57 are two valve seats in such a way as to house the valves 28, 32 described previously.

Furthermore, as illustrated in the sectioned view of FIG. 13, the accessory member 57 has, on its outer face, a first fitting, of a union-tee type, 58, connected to the valve 28, and a second, outlet, fitting, of an L-union type, 19, connected to the valve 32. The two fittings 58, 19 are connected together by a flexible hose 59, positioned outside the accessory member 57, which has the shape of a semi-circumference and surrounds the cover 35. Of course, the constructional details of the connectors 58, 19, connected together by a flexible hose 59, can vary widely with respect to the solution described herein, provided that the same function is obtained. Finally, as illustrated in particular in FIGS. 10, 16, and 17, a tubular element 60 external to the wheel W is connected at an end thereof to the inner chamber of the tyre and is connected at its opposite end to the union tee 58. Hence, thanks to the configuration described above, the air can flow from or to the inner chamber C of the tyre, passing through the tube 60.

The accessory member 57 can be mounted after a conventional procedure of installation of the wheel. The accessory member 57 is fixed to the wheel by means of the same screws that connect the wheel to the hub.

Other embodiments regarding the application described above enable the plenum to be obtained completely within the accessory member 57, thus avoiding the need to provide the cover 35 and the seal rings 37. Likewise, the connection elements 58 and 19 and the hose 59 could be partially or entirely replaced by an appropriate duct provided integrally in the body of the member 57 if the latter is obtained by casting.

Non-Driving Wheels with Body Having a Non-Conventional Configuration

FIGS. 18-22 illustrate application of the system according to the invention to a non-driving wheel WR of the motor-vehicle, having a wheel rim of non-conventional configuration similar to the one described in the case of the driving wheel W of FIGS. 1-9.

The non-driving wheel WR is connected, according to conventional techniques, to a wheel hub 53 by means of bolts (not illustrated). The wheel hub 53 is rotatably mounted, via a ball bearing 52, on a wheel spindle 46. The wheel spindle 46 is carried, according to the conventional technique, by an element of the rear suspension of the motor-vehicle (not visible in the drawings). Coupled to the hub 53 of the wheel WR is a brake disk 1; however, the solution described is equally valid in the case where a drum brake is present.

Figure 18:
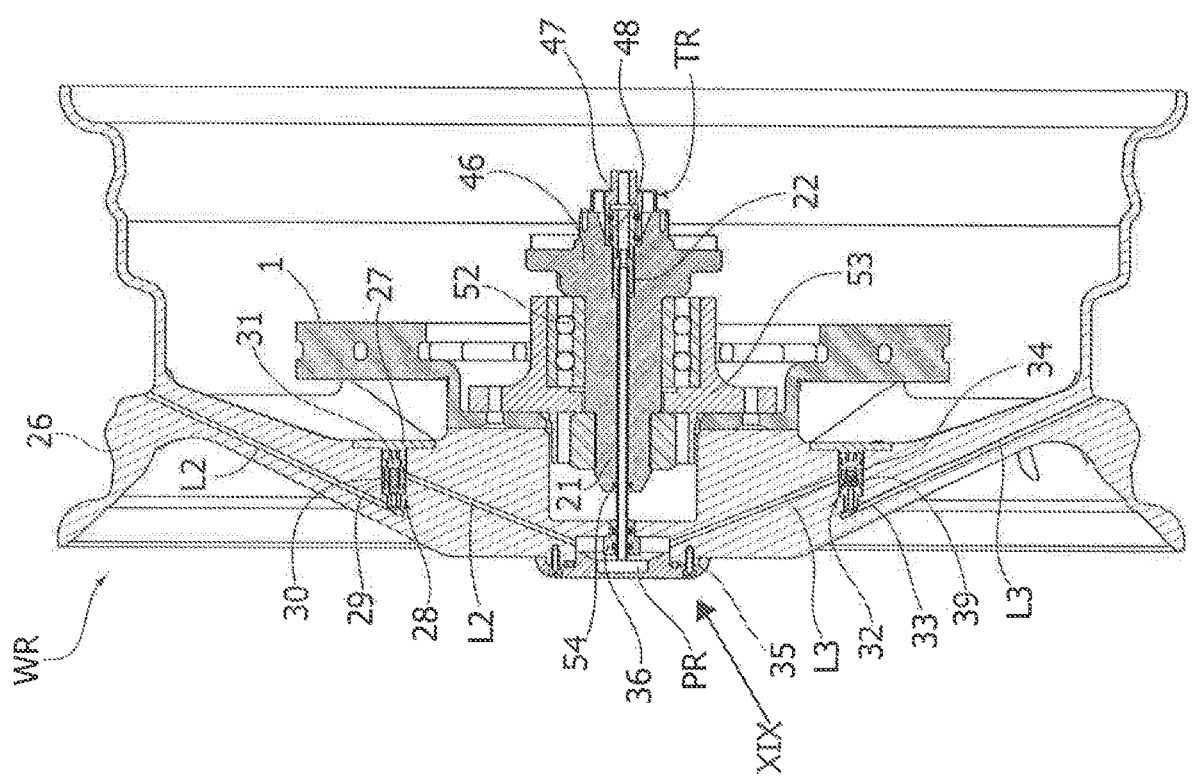
FIG. 18 is a cross-sectional view of the part of the system associated to a non-driving wheel of the motor-vehicle, according to a further embodiment of the invention.
Figure 19:
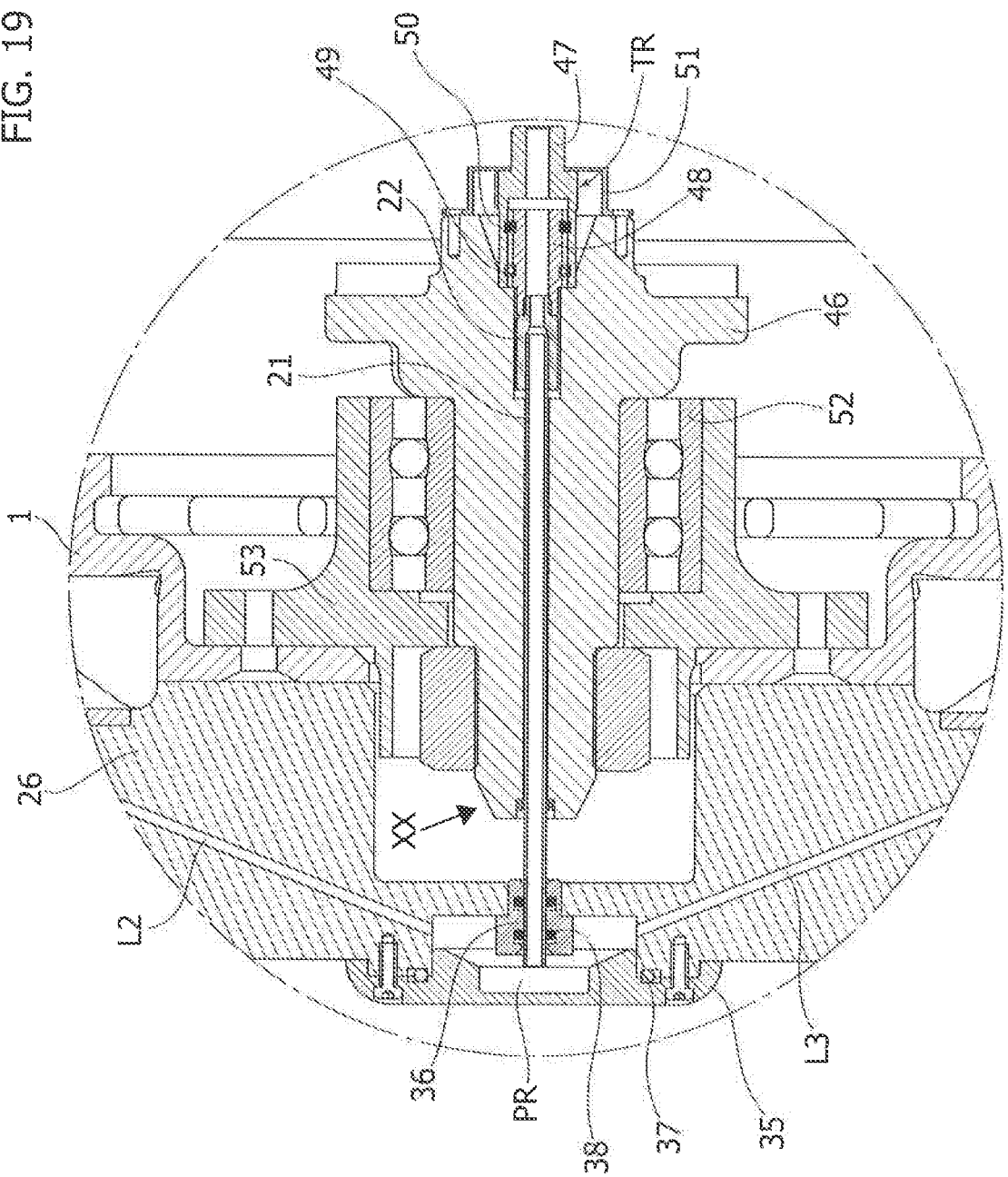
FIG. 19 is a view, at an enlarged scale, of the details denoted by the reference XIX in FIG. 18.

The absence, in this case, of members for transmission of the motion allows a simpler configuration of the system according to the invention as compared to the case of the driving wheels W. In fact, as illustrated in FIGS. 18 and 19, the wheel spindle 46, which is stationary, is traversed by an axial bore, rotatably mounted within which is a rigid tubular element 21 for the passage of air, which is connected in rotation to the wheel WR. This tubular element 21 is connected to the respective peripheral line L1 of the air-supply circuit (described previously) via the pneumatic rotary joint TR.

As may be seen more clearly in FIG. 19, the pneumatic rotary joint TR, obtained according to any one of the methods known to the prior art, has a cylindrical body with a stationary portion 47, connected to the respective peripheral line L1 of the air-supply circuit, and a rotatable portion 48, connected to the tubular element 21. The stationary portion 47 is fixed to the wheel spindle 46 by interposition of a plate 51. The rotatable portion 48 of the joint TR is a bushing rotatably mounted within a tubular end portion of the stationary portion 47 by interposition of a bearing 49 and a seal ring 50. This stationary portion 47 is received and blocked within a seat formed in the internal end of the wheel spindle 46. The rotatable bushing portion 48 is instead rigidly connected to the adjacent end of the tubular element 21 by means of a further bushing 22. The bushing 22 receives inside it the end of the tubular element 21 and is in turn rigidly connected, for example via screwing and/or welding, to the internal bushing 48 of the joint TR.

Figure 20:
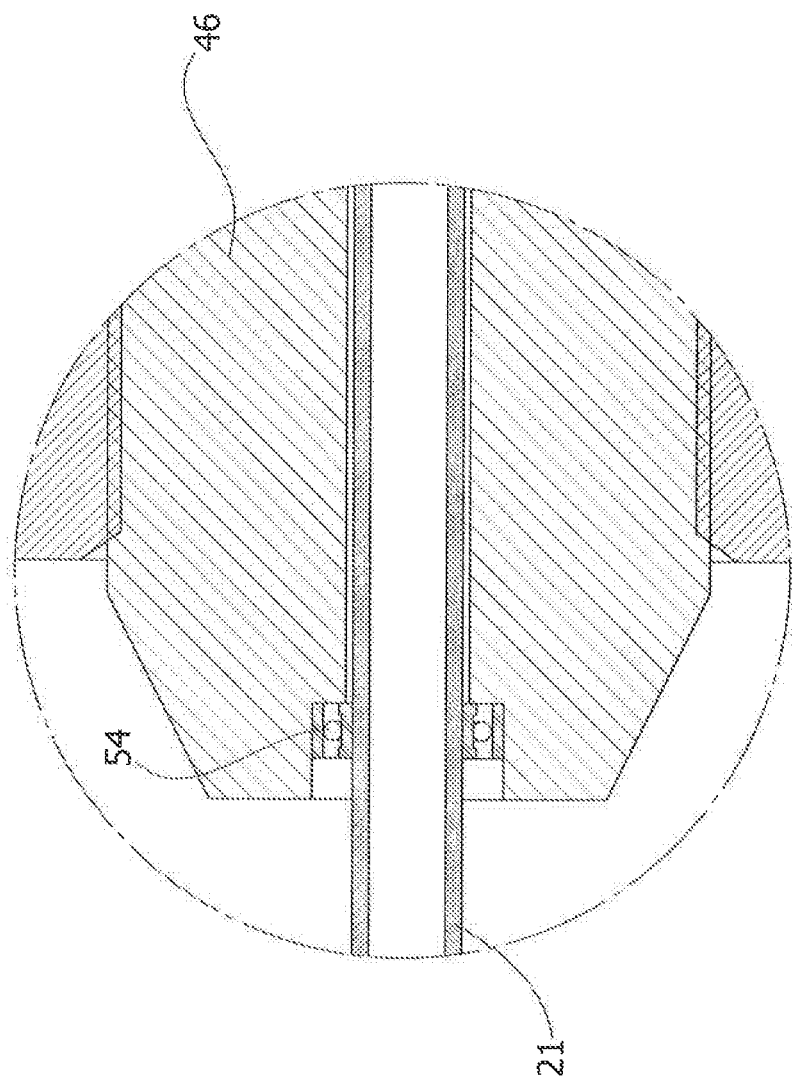
FIG. 20 is a view, at an enlarged scale, of the details denoted by the reference XX in FIG. 19.
Figure 21:
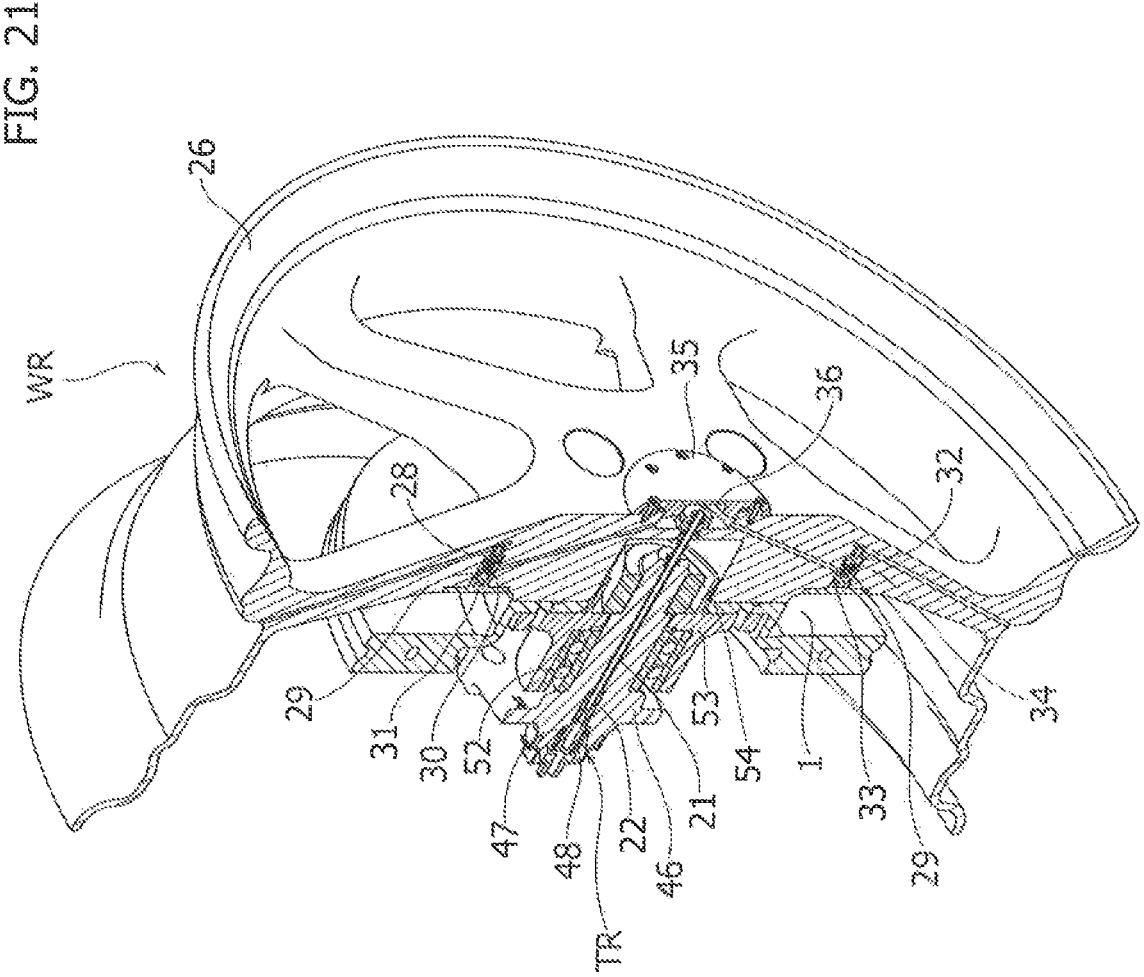
FIGS. 21 and 22 are sectioned perspective views of the details illustrated in FIG. 18.
Figure 22:
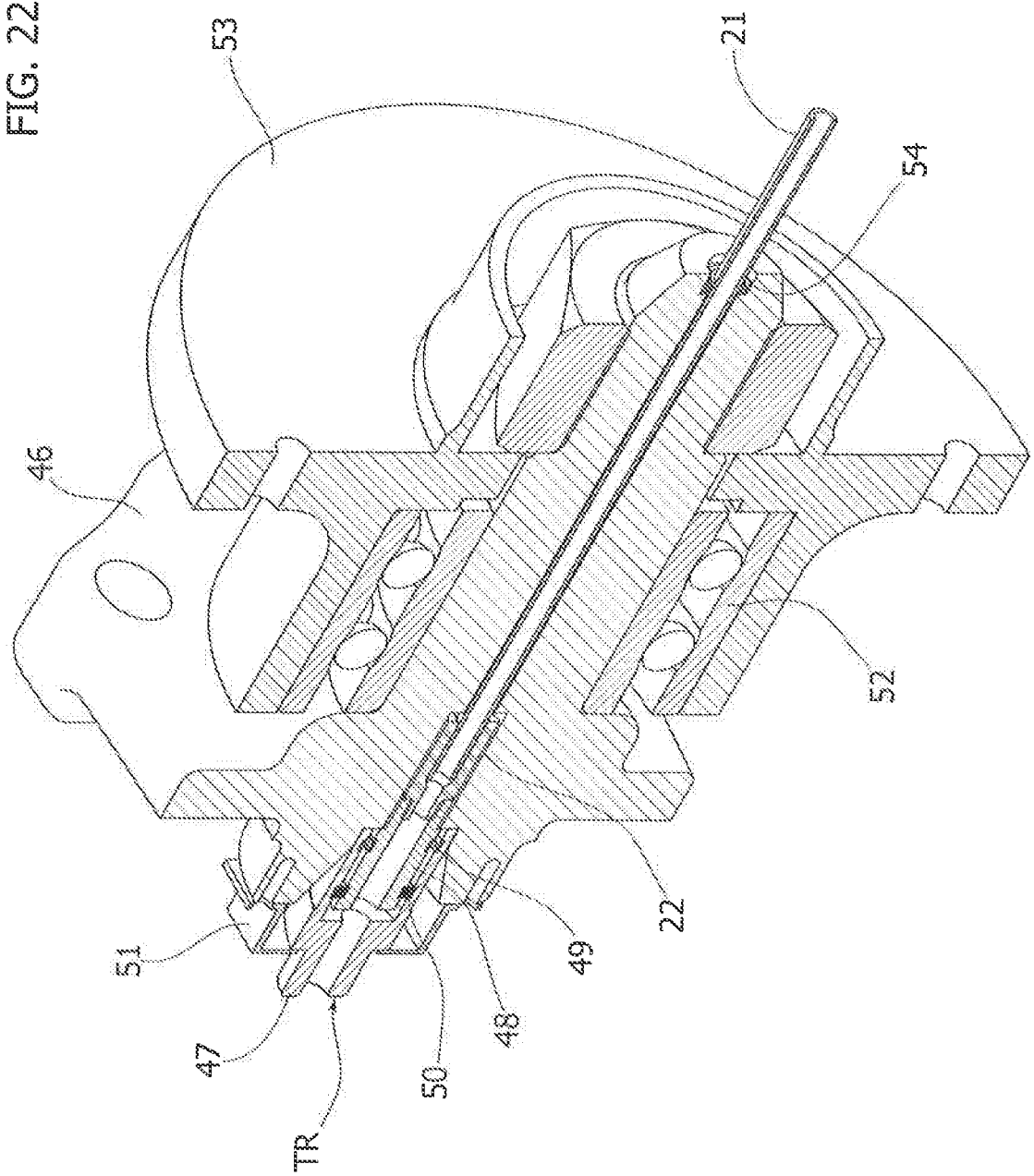

The tubular element 21 is rotatably supported within the wheel spindle 46 at its end via the bushing 22 and is set adjacent to the opposite end via a bearing 54 (see FIG. 20).

The tubular element 21 projects from the end of the wheel spindle 46 facing the wheel WR in order to be connected up to the plenum PR of the wheel WR.

According to FIG. 19, the plenum PR of the non-driving wheel WR is a cavity formed in the same way as what has been described for the plenum P of the driving wheel W. The end of the tubular element 21 that projects from the wheel spindle 46 is received through a hole formed in a front wall of the wheel WR that constitutes the bottom of the cavity defining the plenum PR (as for the plenum P of the wheel W) with interposition of a tubular supporting sealing member 36 similar to the one described for the driving wheel W. Also for the non-driving wheel WR the manoeuvre of installation and removal of the wheel is hence considerably simplified as compared to similar systems described in the prior art and altogether similar to the one already described for the driving wheel W of FIGS. 1-9.

Monitoring of the Pressure of the Tyres

With reference once again to FIGS. 23 and 24 and taking into account the modalities according to which the system is implemented, the line L1 on which the pressure sensor 103 is set is connected to the atmosphere when the system is not carrying out inflation or deflation. When it is necessary to monitor the pressure of one of the tyres of the motor-vehicle, the electronic control unit activates for an extremely short time interval the air-supply circuit, so as to open, during this brief transient, communication between the chambers C and the peripheral lines L1 on which the pressure sensors 103 are installed. The control unit E acquires the signal coming from the sensor 103 set on the line for which measurement is in progress. Given the depressurization of the line L1 at the end of actuation, on the basis of the modality of actuation described previously, the control unit E may easily identify the last pressure value acquired before the end of the measurement actuation.

On the basis of the signal of the sensor 103 and of the known correlation between the pressure in the lines L1 and the pressure of the tyres, previously evaluated empirically and implemented in the control unit E, the control unit E is able to calculate the pressure in the chambers of the tyres.

The algorithm described above, for estimating the pressure in the inner chamber C of the tyre according to the signal coming from the sensor 103 installed on the line L1 hence becomes necessary since the line L1 is not connected to the aforesaid inner chamber C in the conditions of non-activation of the system owing to the presence of the valves 28 and 32. It follows that the algorithm is sensitive to the specific configuration of the system presented in FIGS. 23 and 24 and to the actuation modes described previously.

Of course, without prejudice to the principle of the invention, the details of construction and the embodiments may vary widely with respect to what has been described and illustrated herein purely by way of example, without thereby departing from the scope of the present invention.

As is evident from the foregoing description, the system according to the invention affords multiple advantages. First of all, the invention achieves the advantage of having a deflation valve that guarantees, in a precise way, a minimum pressure in the inner chamber C of the tyre. Below this minimum pressure, the tyre cannot in any case be deflated by the system, even in the case of unforeseen malfunctioning that may lead the system to require further deflation even though the pressure of the tyres is already low. The aforesaid deflation valve moreover isolates the tyre from the rest of the system when an operation of inflation or deflation is not in progress, enabling depressurization of the rotating pneumatic joint in the resting conditions of the system and guaranteeing maintenance of the pressure in the tyre in any condition that entails connection of the stretch L1 to the atmosphere. A further advantageous factor, no less important than the previous ones, is the proposed use of two separate lines for inflation and deflation of each tyre. These aspects ensure a high reliability of the system, which is a basic requirement in the passenger motor-vehicle sector.

The method proposed for monitoring the inflation pressure of the tyres by use of wired pressure sensors set in the central part of the system moreover affords the advantage of a high accuracy as compared to known systems for estimating the pressure of the tyres and at the same time makes it possible to avoid the complications linked to installation of sensors set directly on the wheel.

The layout of the system according to the invention may be readily applied to any type of vehicle and represents a significant improvement over the prior art in the field of CTI systems.

The system ensures communication between the inner chamber of each tyre and the stationary part of the circuit in the cases of driving wheels and non-driving wheels typical of passenger vehicles and of light commercial vehicles. Some constructional solutions envisaged according to the invention make it possible to avoid, if so desired, modifications to the architecture of the wheel and enable minimization of the interventions on the mechanical parts involved. The invention enables use of components that are substantially identical or only minimally modified with respect to standard production components. The preferred configurations moreover make it possible to keep the operations of installation and removal of the wheels and of the system itself simple, easy, and safe. All the components of the system according to the invention are simple and inexpensive.

Finally, the system according to the invention ensures a series of further improvements, through implementation of additional functions. For instance, the electronic control unit E can be programmed for receiving signals indicating the vertical load on the wheels (these being supplied by sensors of any known type), enabling calculation accordingly of an ideal value of inflation pressure, as well as activation of the circuit in order to achieve this ideal pressure value.

The invention claimed is:

1. An on-board centralized system for regulating pressure of tyres of a motor-vehicle, comprising:
a source of pressurized air; and
a circuit that sets the source of pressurized air in communication with an inner chamber of a tyre of each wheel of the motor-vehicle,
said circuit comprising:
a first connection line and a second connection line, set in parallel to one another, for deflating and inflating, respectively, the tyre of each wheel; and
a first one-way valve and a second one-way valve interposed, respectively, in said first and second connection lines to allow only a flow of air, respectively, from and to the inner chamber of the tyre of each wheel,
there being associated to said first one-way valve a return spring having a pre-set load in such a way as to:
isolate the inner chamber of the tyre of each wheel from a part of the circuit upstream of the first one-way valve, when said upstream part of the circuit is at atmospheric pressure and a pressure within the inner chamber is lower than a pressure value corresponding to the pre-set load; and
guarantee a pre-set minimum value of pressure in the inner chamber of the tyre of each wheel when the part of the circuit upstream of the first one-way valve is at a pressure lower than atmospheric pressure;
wherein the passage of air from the source of pressurized air to the inner chamber of the tyre of each wheel occurs by a distribution plenum connected to the inflation and deflation lines; and
wherein, for one or more of the wheels of the motor-vehicle, the plenum of the one or more wheels is defined within an accessory member mounted at a front on a free end of a wheel spindle associated to the one or more wheels.

2. The system according to claim 1, wherein said accessory member carries said first and second one-way valves and incorporates passages defining portions of said first and second connection lines between the plenum and the one-way valves, said one-way valves being connected to the inner chamber of the respective tyres via respective hoses.

3. An on-board centralized system for regulating pressure of tyres of a motor-vehicle, comprising:
a source of pressurized air; and
a circuit that sets the source of pressurized air in communication with an inner chamber of a tyre of each wheel of the motor-vehicle,
said circuit comprising:
a first connection line and a second connection line, set in parallel to one another, for deflating and inflating, respectively, the tyre of each wheel; and
a first one-way valve and a second one-way valve interposed, respectively, in said first and second connection lines to allow only a flow of air, respectively, from and to the inner chamber of the tyre of each wheel, there being associated to said first one-way valve a return spring having a pre-set load in such a way as to:
  isolate the inner chamber of the tyre of each wheel from a part of the circuit upstream of the first one-way valve, when said upstream part of the circuit is at atmospheric pressure and a pressure within the inner chamber is lower than a pressure value corresponding to the pre-set load; and
  guarantee a pre-set minimum value of pressure in the inner chamber of the tyre of each wheel when the part of the circuit upstream of the first one-way valve is at a pressure lower than atmospheric pressure;
wherein the passage of air from the source of pressurized air to the inner chamber of the tyre of each wheel occurs by a distribution plenum connected to the inflation and deflation lines; and
wherein said plenum of each wheel is a cavity formed in a front surface of each wheel and each closed by a cover removably fastened to each wheel.

4. The system according to claim 3, wherein for one or more of the wheels of the motor-vehicle, said first and second connection lines are formed in a body of the one or more wheels and said first and second one-way valves are received in seats formed in the body of the one or more wheels.

5. An on-board centralized system for regulating pressure of tyres of a motor-vehicle, comprising:
  a source of pressurized air; and
  a circuit that sets the source of pressurized air in communication with an inner chamber of a tyre of each wheel of the motor-vehicle,
  said circuit comprising:
    a first connection line and a second connection line, set in parallel to one another, for deflating and inflating, respectively, the tyre of each wheel; and
    a first one-way valve and a second one-way valve interposed, respectively, in said first and second connection lines to allow only a flow of air, respectively, from and to the inner chamber of the tyre of each wheel,
  there being associated to said first one-way valve a return spring having a pre-set load in such a way as to:
    isolate the inner chamber of the tyre of each wheel from a part of the circuit upstream of the first one-way valve, when said upstream part of the circuit is at atmospheric pressure and a pressure within the inner chamber is lower than a pressure value corresponding to the pre-set load; and
    guarantee a pre-set minimum value of pressure in the inner chamber of the tyre of each wheel when the part of the circuit upstream of the first one-way valve is at a pressure lower than atmospheric pressure;
  wherein:
  a wheel spindle of each driving wheel is rotatably supported on a wheel support and is connected in rotation to a respective axle shaft via a constant-velocity joint having an input member connected in rotation to an axle shaft and an output member rigidly connected to said wheel spindle; and
  said output member of the constant-velocity joint and said wheel spindle have an internal duct for the passage of air,
  wherein said internal duct has a first end that gives out onto an outer surface of said output member, and that is connected by a flexible hose to an outlet fitting of a pneumatic rotary joint having an inlet connected to the circuit for supplying pressurized air; said internal duct having a second end giving out onto an end surface of the wheel spindle and communicating with a respective plenum of each driving wheel; and
  wherein said second end of the internal duct is connected to said plenum by a tubular connection element having a first end sealingly connected to said second end of said internal duct and a second end giving out into the plenum formed in a body of the driving wheel or in an accessory member.

6. The system according to claim 5, wherein the tubular element is received through said hole, with interposition of a tubular supporting sealing member.

7. An on-board centralized system for regulating pressure of tyres of a motor-vehicle, comprising:
  a source of pressurized air; and
  a circuit that sets the source of pressurized air in communication with an inner chamber of a tyre of each wheel of the motor-vehicle,
  said circuit comprising:
    a first connection line and a second connection line, set in parallel to one another, for deflating and inflating, respectively, the tyre of each wheel; and
    a first one-way valve and a second one-way valve interposed, respectively, in said first and second connection lines to allow only a flow of air, respectively, from and to the inner chamber of the tyre of each wheel,
  there being associated to said first one-way valve a return spring having a pre-set load in such a way as to:
    isolate the inner chamber of the tyre of each wheel from a part of the circuit upstream of the first one-way valve, when said upstream part of the circuit is at atmospheric pressure and a pressure within the inner chamber is lower than a pressure value corresponding to the pre-set load; and
    guarantee a pre-set minimum value of pressure in the inner chamber of the tyre of each wheel when the part of the circuit upstream of the first one-way valve is at a pressure lower than atmospheric pressure;
  wherein:
  the wheel spindle of each non-driving wheel is traversed by an internal axial bore, rotatably supported within which is a tubular element for the passage of air, said tubular element having a first end connected to the air-supply circuit via a pneumatic rotary joint and a second end axially projecting from an end surface of the wheel spindle and communicating with a respective plenum of each non-driving wheel,
  wherein the second end of the tubular element that projects from the wheel spindle of each non-driving wheel is received through a hole formed in a front wall of each non-driving wheel, which constitutes a bottom of a cavity defining the respective plenum of each non-driving wheel or else through a hole formed in an accessory member for each non-driving wheel, which integrates the respective plenum.

8. The system according to claim 7, wherein the tubular element is received through said hole, with interposition of a tubular supporting sealing member.

* * * * *